(12) United States Patent
Koike et al.

(10) Patent No.: US 11,197,804 B2
(45) Date of Patent: Dec. 14, 2021

(54) TABLET GUIDE PATH-ADJUSTING DEVICE OF TABLET CASSETTE

(71) Applicant: Yuyama Mfg. Co., Ltd., Osaka (JP)

(72) Inventors: Naoki Koike, Osaka (JP); Mitsuhiro Mitani, Osaka (JP); Akira Maeda, Osaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 30 days.

(21) Appl. No.: 16/639,513

(22) PCT Filed: Aug. 6, 2018

(86) PCT No.: PCT/JP2018/029363
§ 371 (c)(1),
(2) Date: Feb. 14, 2020

(87) PCT Pub. No.: WO2019/035379
PCT Pub. Date: Feb. 21, 2019

(65) Prior Publication Data
US 2021/0022961 A1    Jan. 28, 2021

(30) Foreign Application Priority Data

Aug. 15, 2017  (JP) .............................. JP2017-156797
Jul. 9, 2018  (JP) .............................. JP2018-130293

(51) Int. Cl.
*A61J 7/00*   (2006.01)
*A61J 1/03*   (2006.01)
(Continued)

(52) U.S. Cl.
CPC .............. *A61J 7/0076* (2013.01); *A61J 1/03* (2013.01); *A61J 1/1412* (2013.01); *B65G 1/08* (2013.01);
(Continued)

(58) Field of Classification Search
CPC .......... A61J 7/0076; A61J 1/03; A61J 1/1412; G07F 17/0092; B65D 83/0409; B65G 2201/027
See application file for complete search history.

(56) References Cited

U.S. PATENT DOCUMENTS 4,480,200 A    10/1984  Tan et al.
5,259,532 A *  11/1993  Schwarzli ............... G07F 11/44
                                                          221/203
(Continued)

FOREIGN PATENT DOCUMENTS

| EP | 2572995 A1 | 3/2013 |
| EP | 2664316 A1 | 11/2013 |
| WO | WO2012/096328 A1 | 7/2012 |

OTHER PUBLICATIONS

WIPO, Japanese International Search Authority, International Search Report with English Translation and Written Opinion dated Oct. 30, 2018 in International Patent Application No. PCT/JP2018/029363, 10 pages.
(Continued)

*Primary Examiner* — Timothy R Waggoner
(74) *Attorney, Agent, or Firm* — Masuvalley & Partners

(57) ABSTRACT

Provided is a tablet guiding path adjusting apparatus that adjusts a tablet guiding path adjusting mechanism in the tablet cassette, comprising a rotor rotatably equipped within a cassette body and having a tablet guiding path for receiving at least one of tablets received within the cassette body and guiding to a discharging orifice of the cassette body; a partition member for entering the tablet guiding path and being located between a tablet at the lowest part and a tablet at the upper side thereof; and tablet guiding paths adjusting mechanisms configured to adjust at least either dimension of the depth and width of the tablet guiding path to the rotor; wherein the tablet guiding path adjusting apparatus engages
(Continued)

with engaging parts of the tablet guiding path adjusting mechanisms to operate the tablet guiding path adjusting mechanism, and adjusts a dimension of the tablet guiding path in accordance with the shape or size of tablets received within the cassette body.

10 Claims, 25 Drawing Sheets

(51) Int. Cl.
*A61J 1/14* (2006.01)
*B65G 1/08* (2006.01)
*B65G 47/84* (2006.01)
*G07F 17/00* (2006.01)

(52) U.S. Cl.
CPC ......... *B65G 47/84* (2013.01); *G07F 17/0092* (2013.01); *B65G 2201/027* (2013.01)

(56) References Cited

U.S. PATENT DOCUMENTS

| | | | | |
|---|---|---|---|---|
| 2006/0213917 | A1* | 9/2006 | Handfield | G16H 20/13 221/13 |
| 2014/0014678 | A1* | 1/2014 | Yuyama | G07F 17/0092 221/277 |
| 2014/0339252 | A1* | 11/2014 | Bae | G07F 17/0092 221/277 |
| 2015/0090733 | A1* | 4/2015 | Park | G07F 17/0092 221/1 |
| 2018/0161247 | A1* | 6/2018 | Koike | A61J 3/00 |

OTHER PUBLICATIONS

EPO, Extended European Search Report dated May 18, 2021 in European Application No. EP 18846808.6, 9 pages.

* cited by examiner

[Fig. 1]
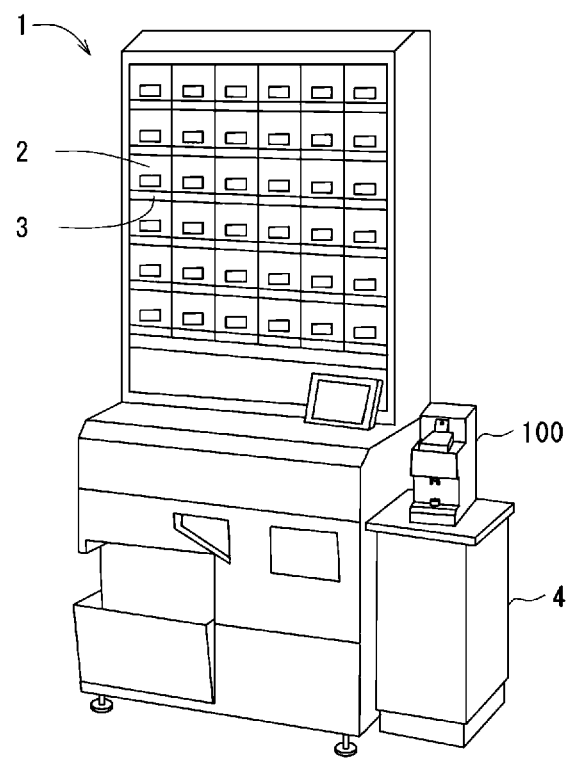
[Fig. 2]
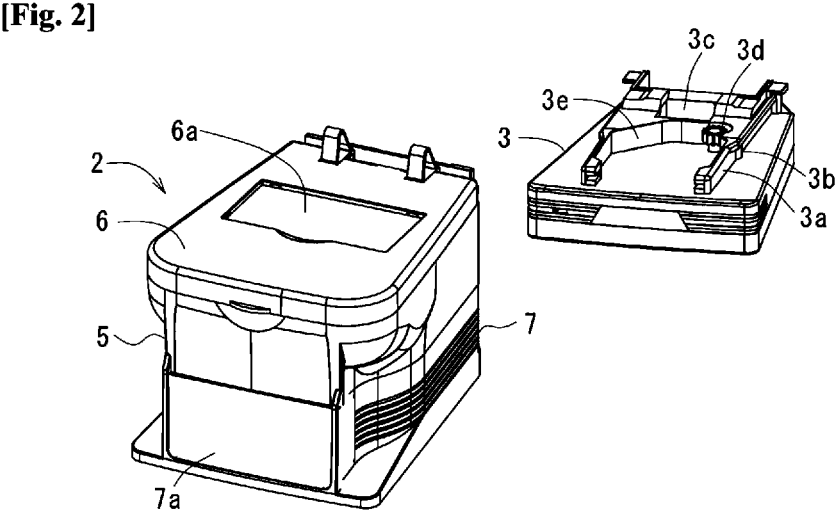

[Fig. 3]
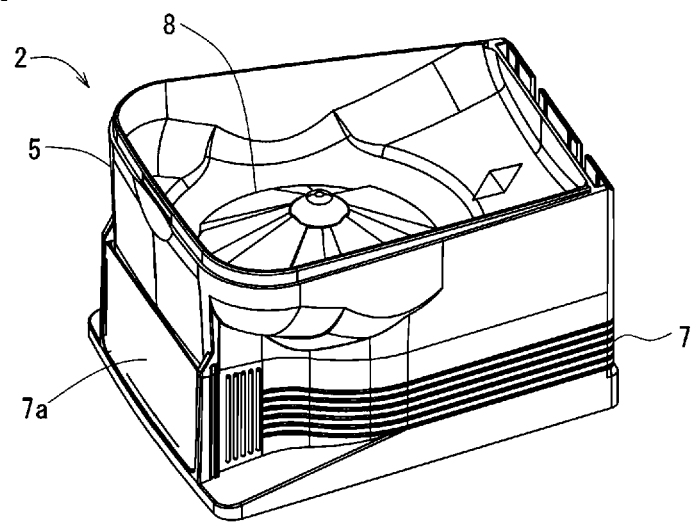
[Fig. 4]
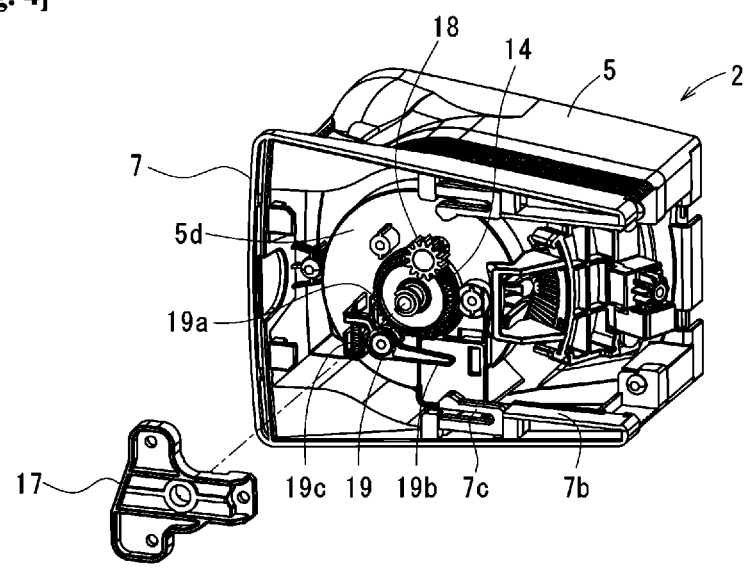

[Fig. 5]
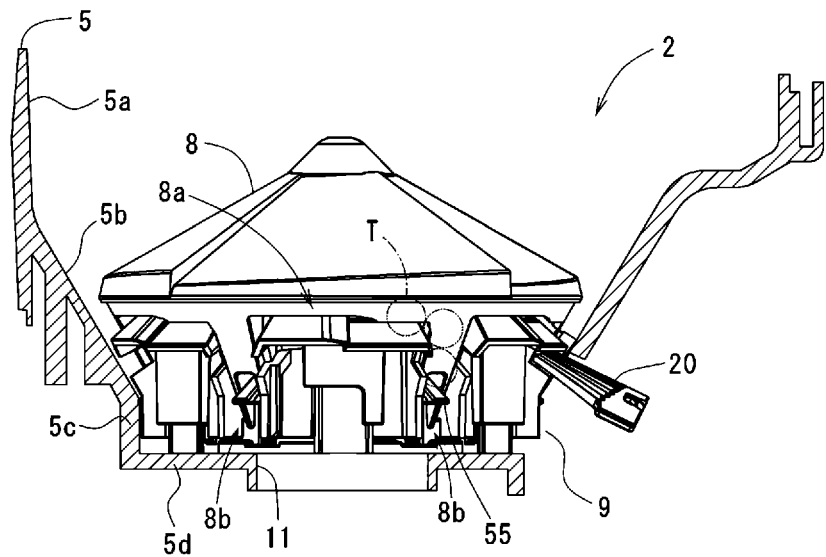
[Fig. 6]
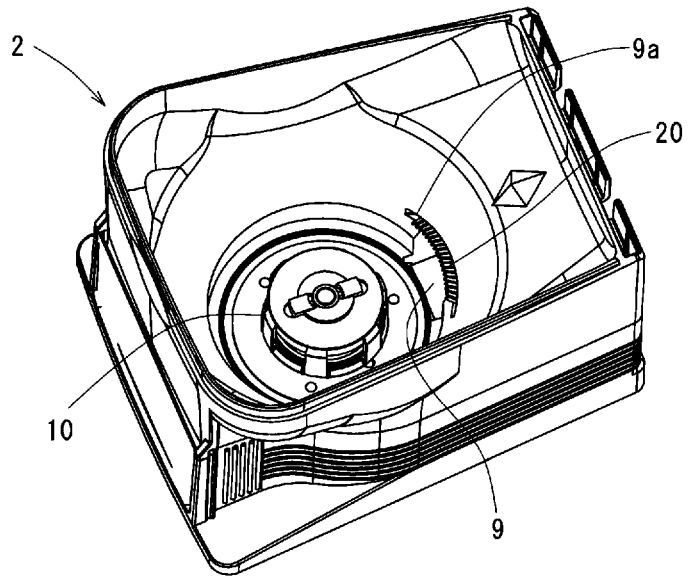

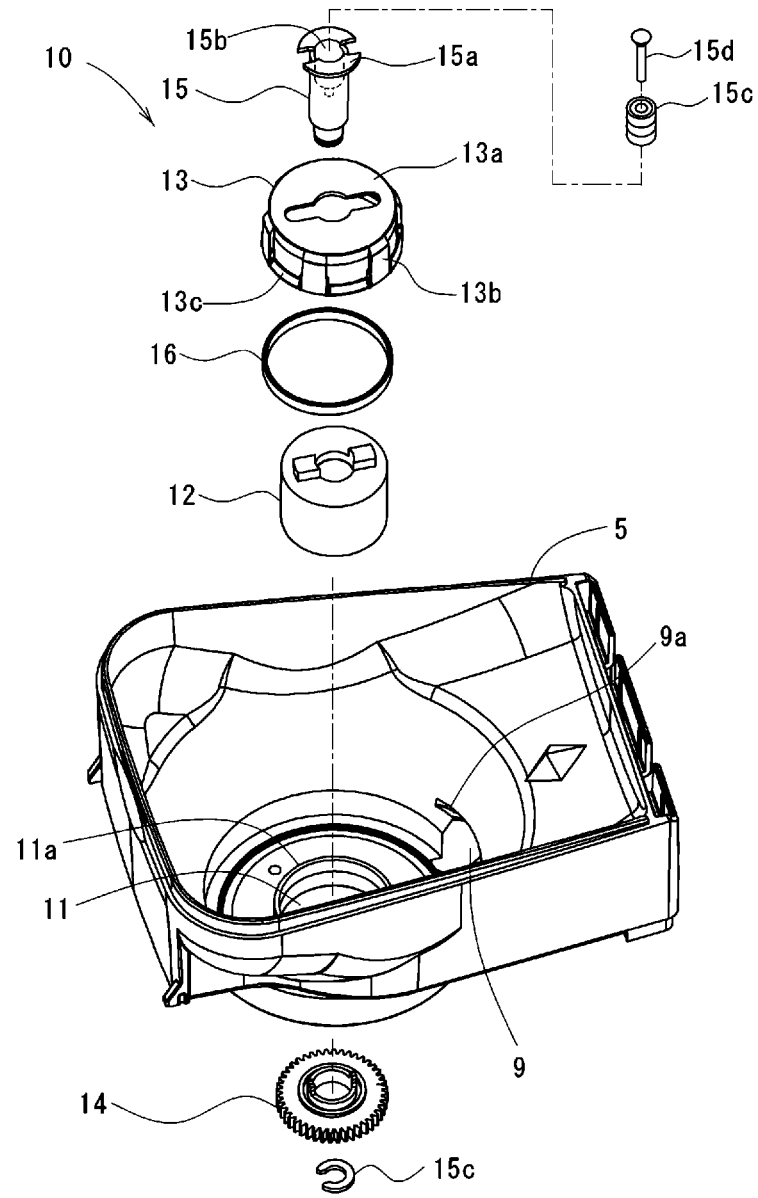
[Fig. 7]

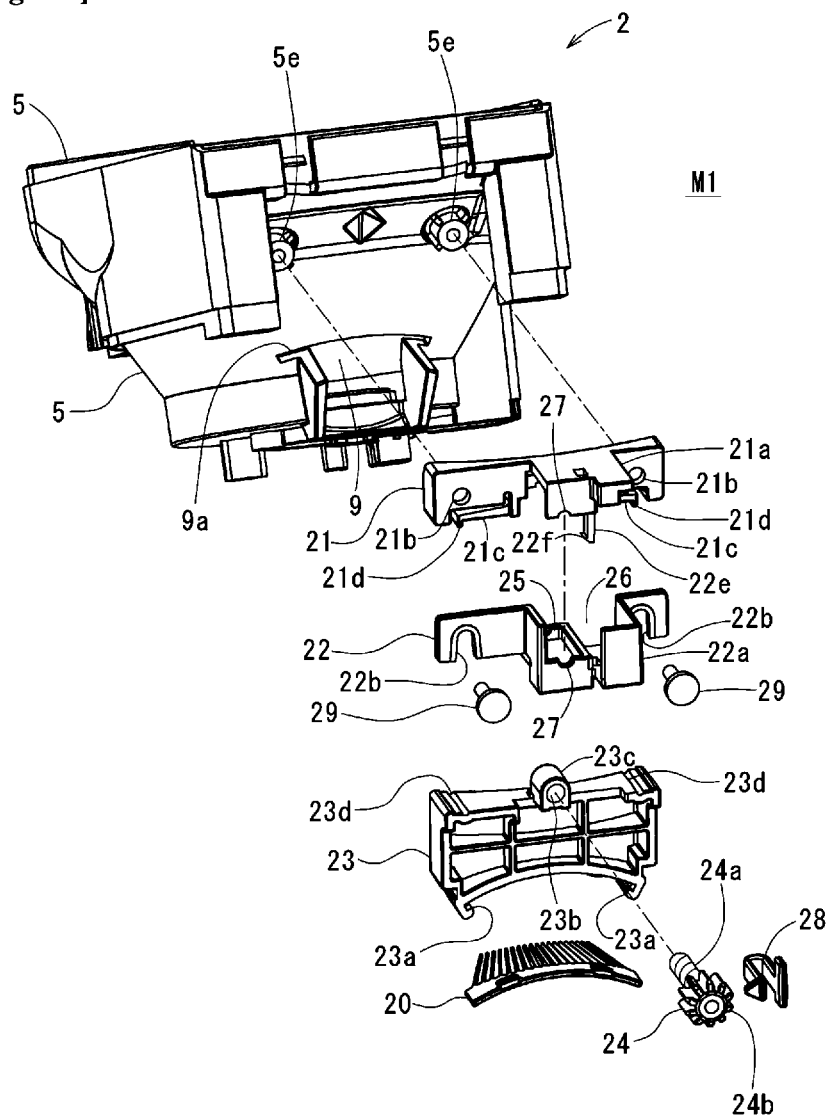
[Fig. 8A]

[Fig. 8B]
(a)  (b)
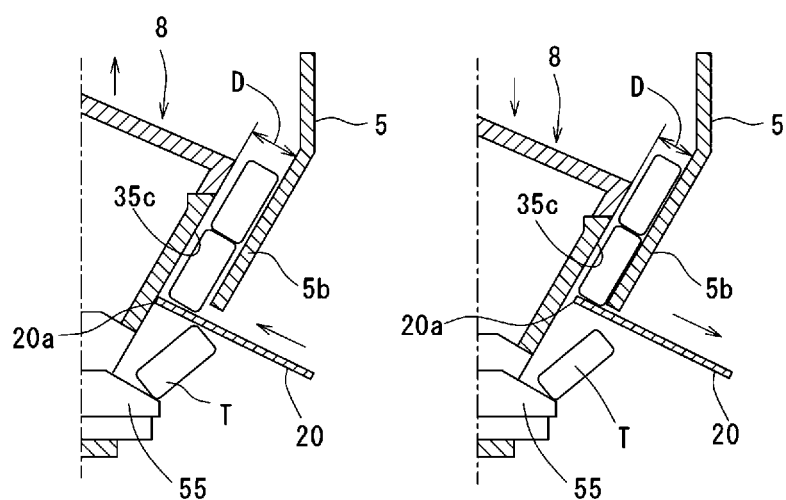
[Fig. 9]
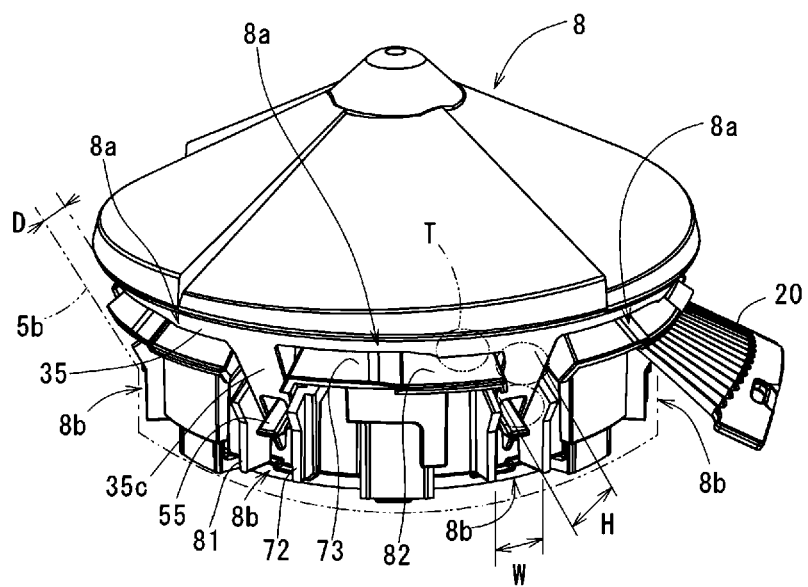

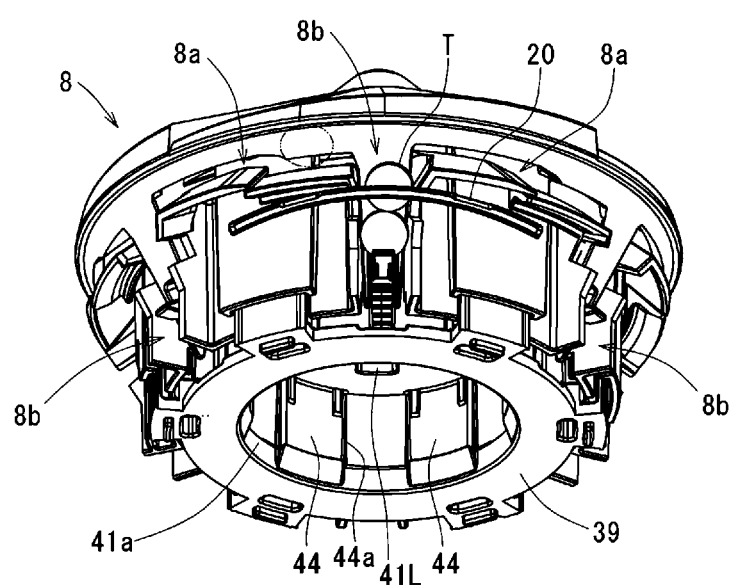
[Fig. 10]

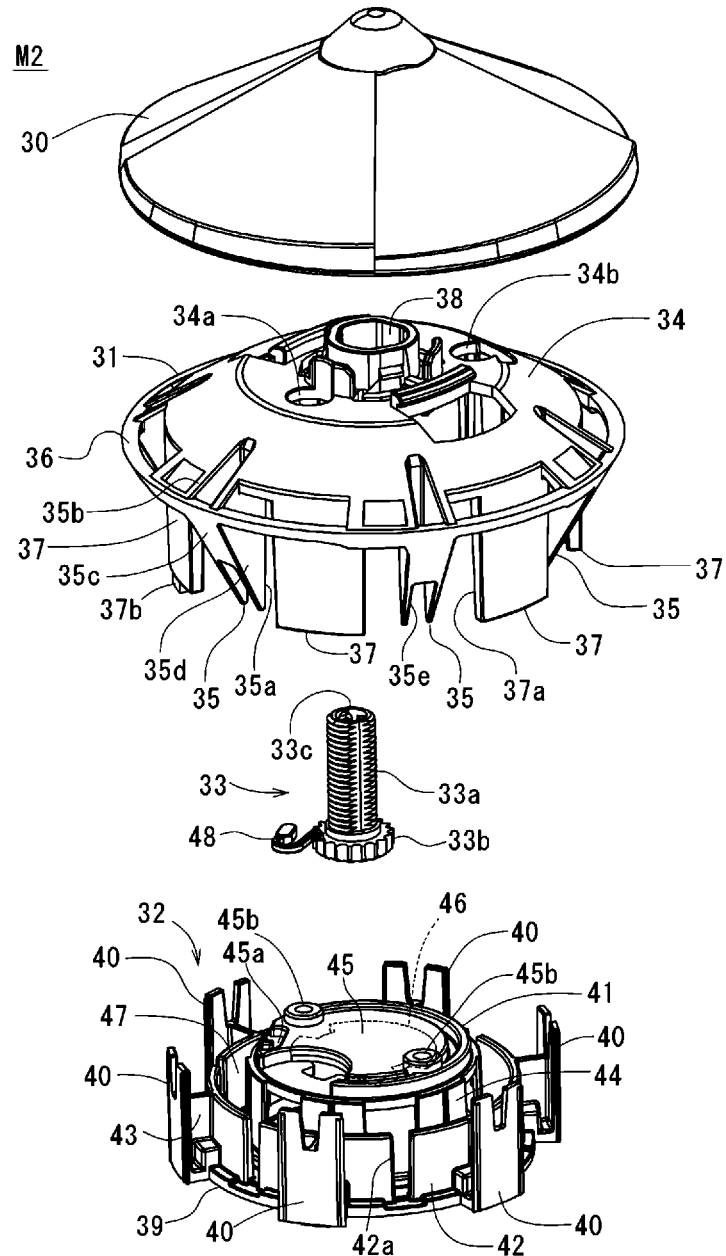
[Fig. 11]

[Fig. 12]
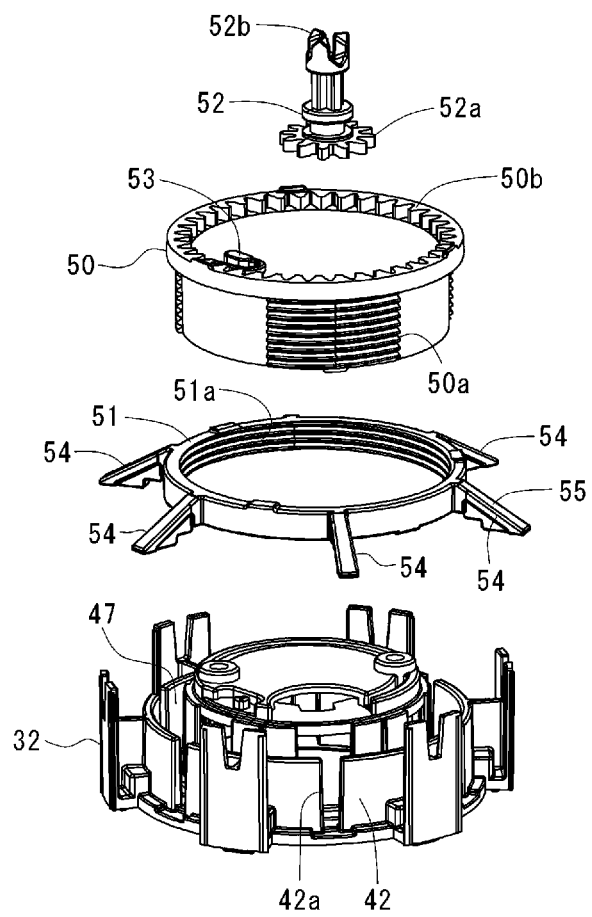

[Fig. 13]
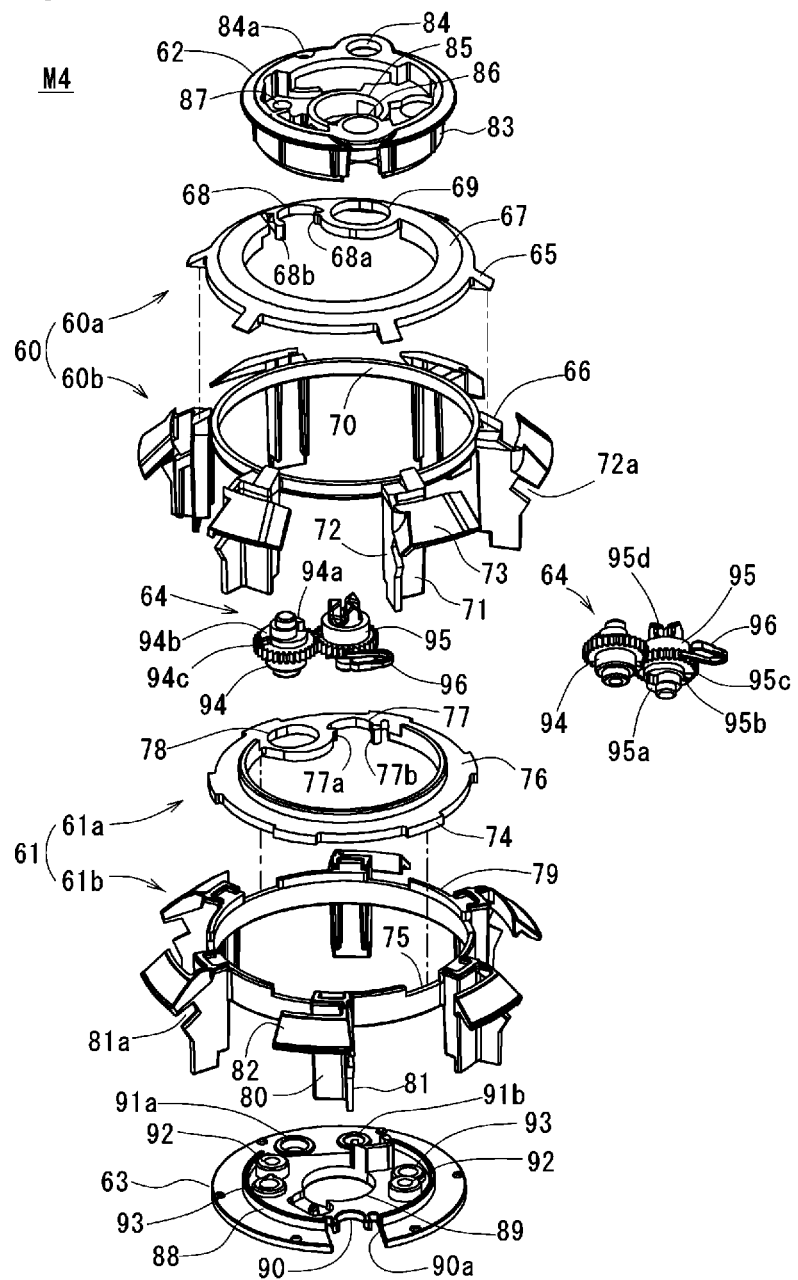

[Fig. 14]
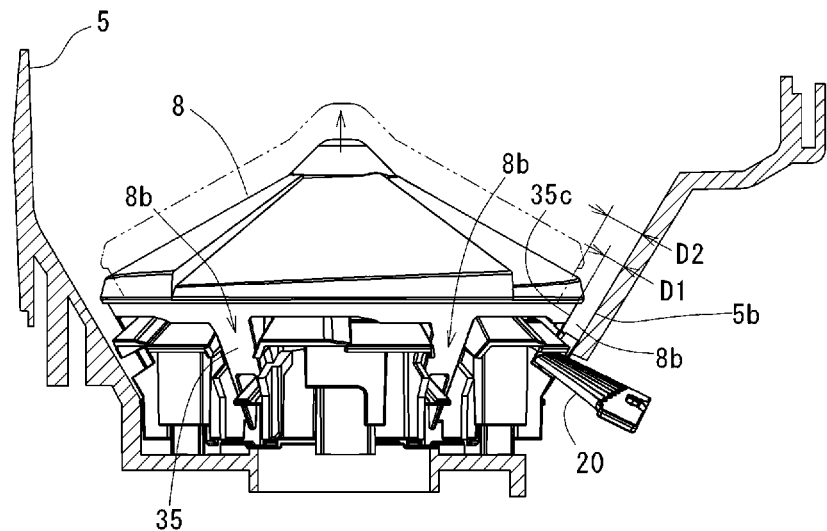
[Fig. 15]
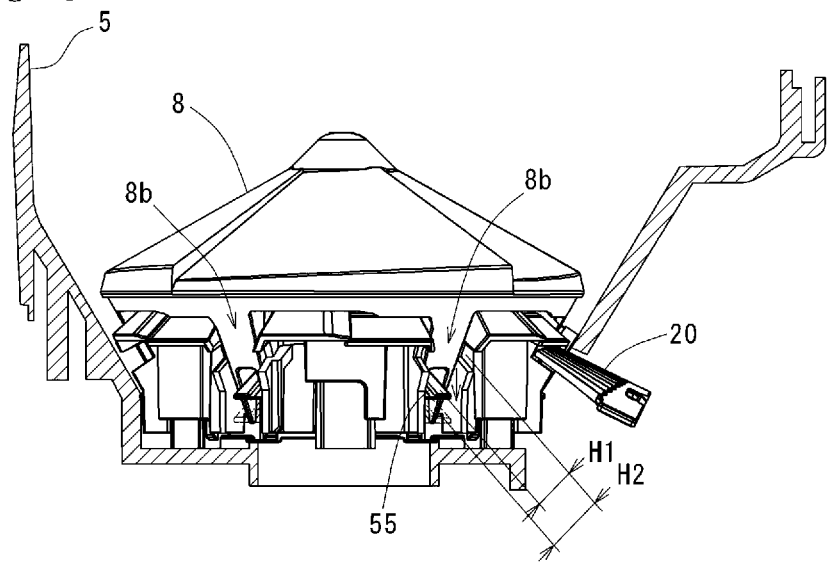

[Fig. 16]
(a)
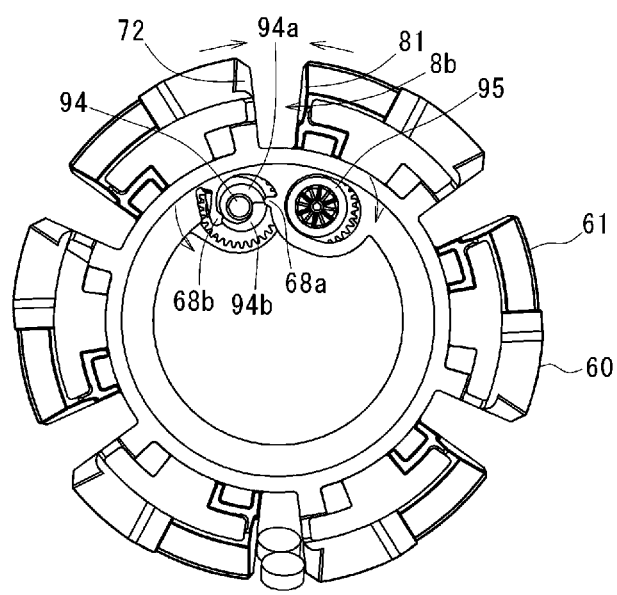
(b)
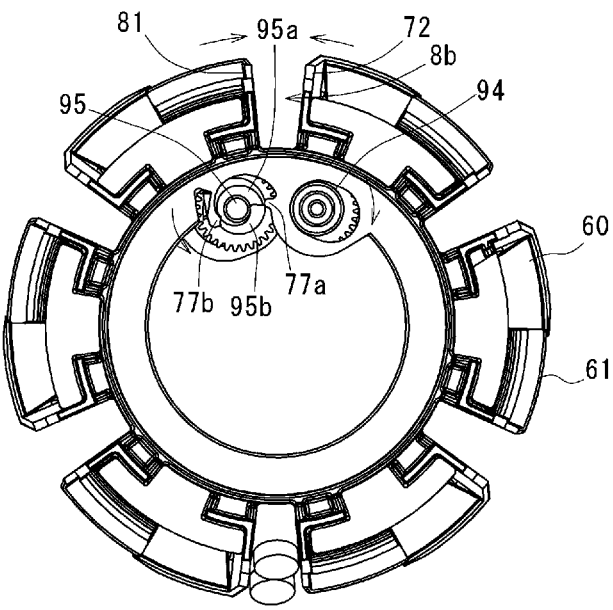

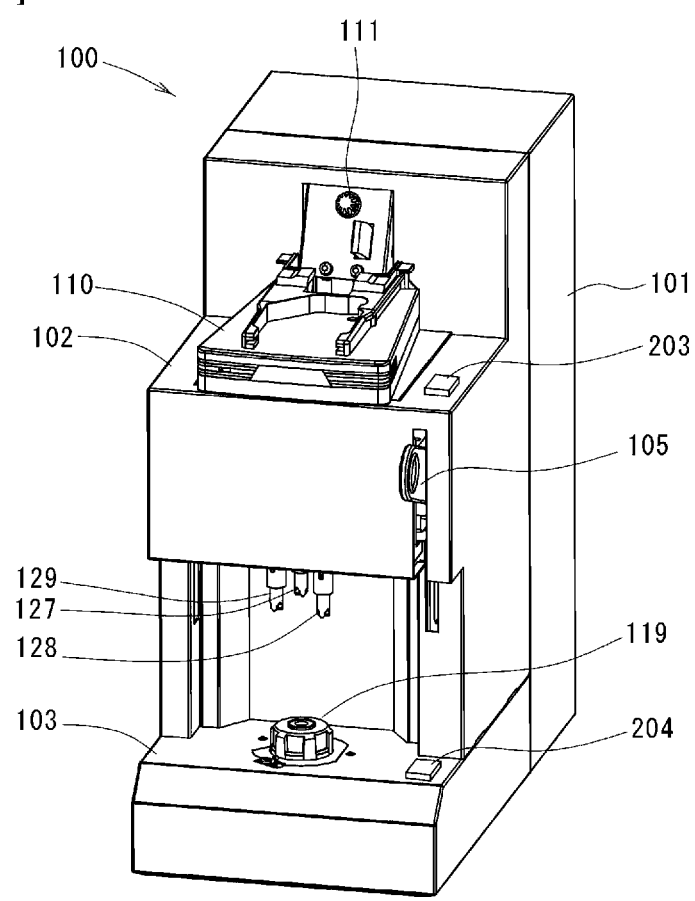
[Fig. 17]

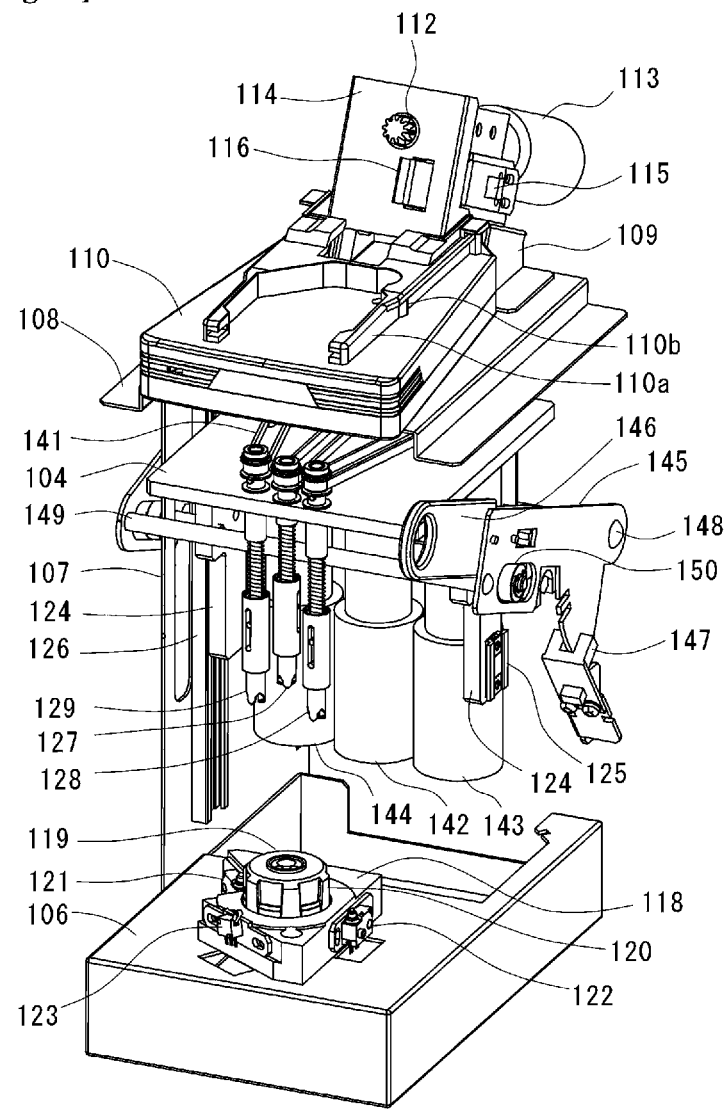
[Fig. 18]

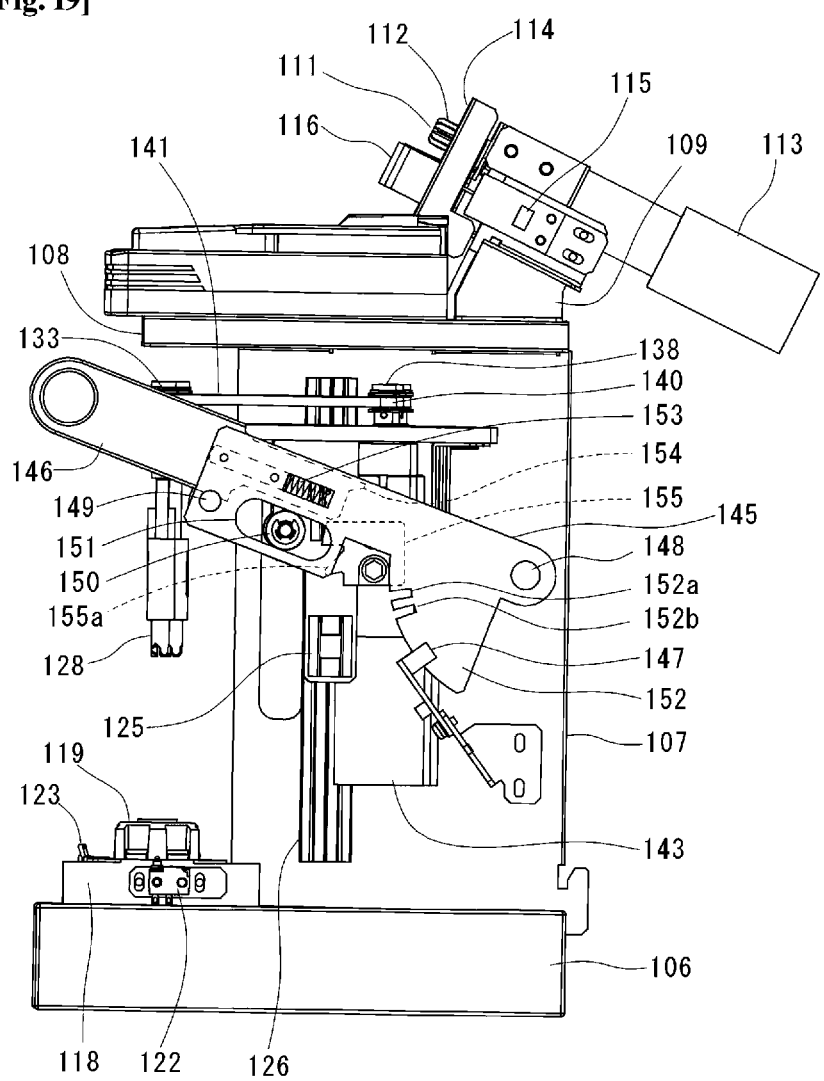
[Fig. 19]

[Fig. 20]
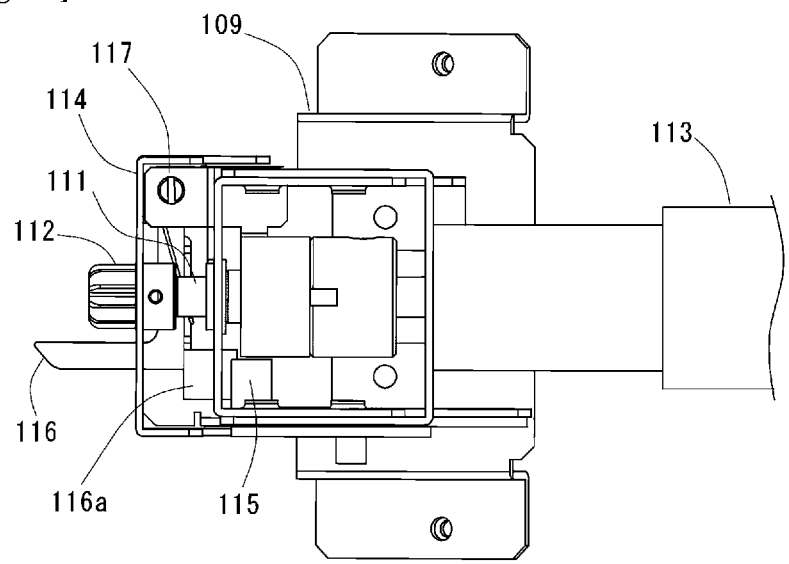
[Fig. 21]
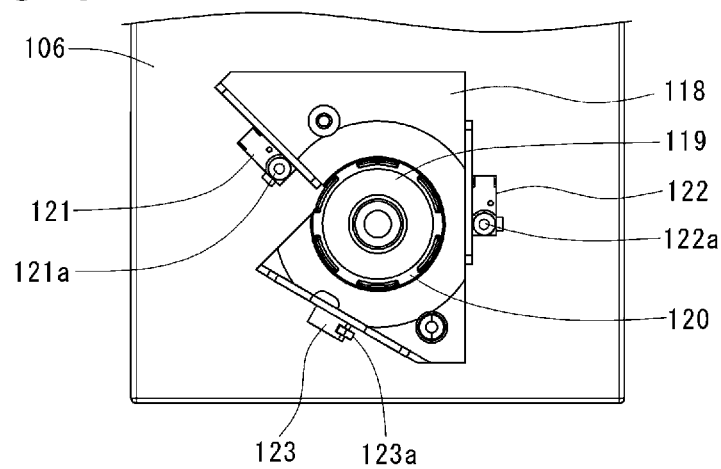

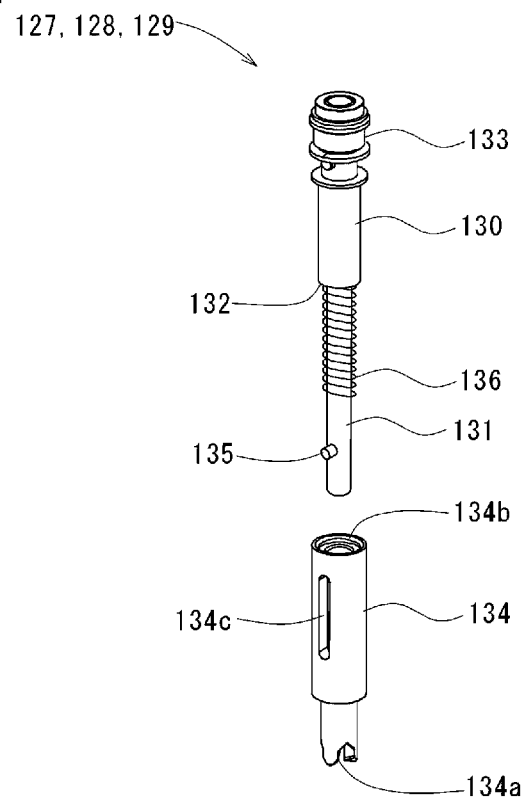
[Fig. 22]

[Fig. 23]
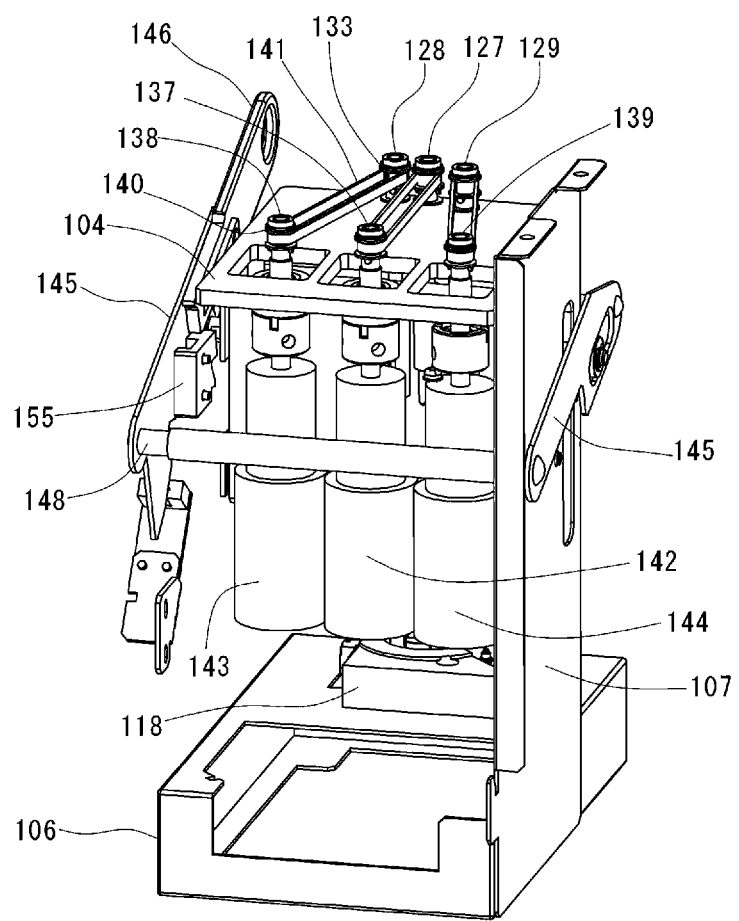

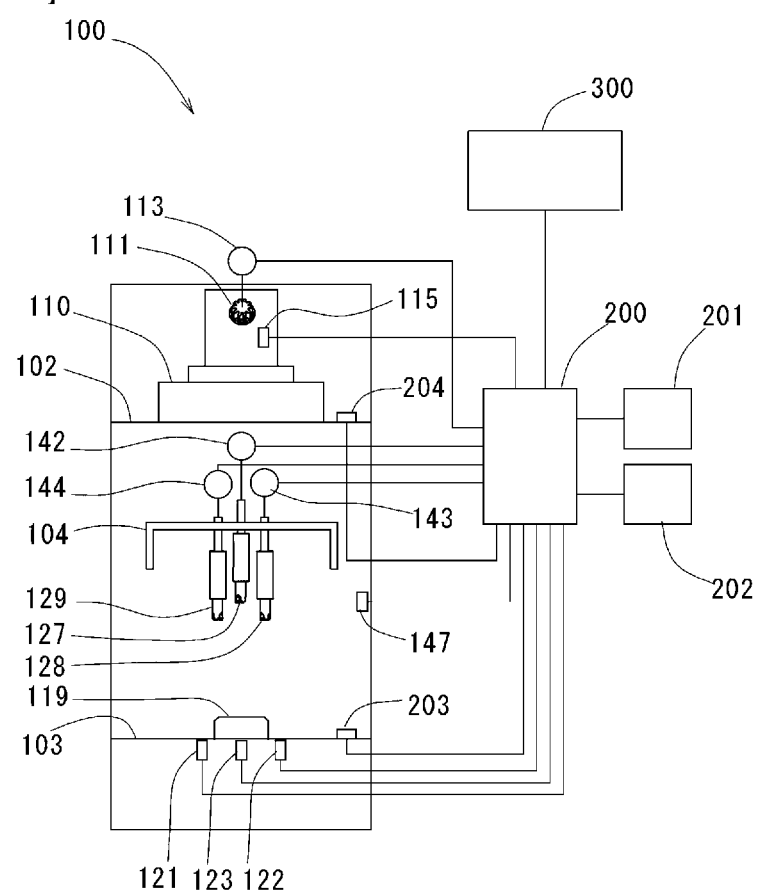
[Fig. 24]

[Fig. 25]
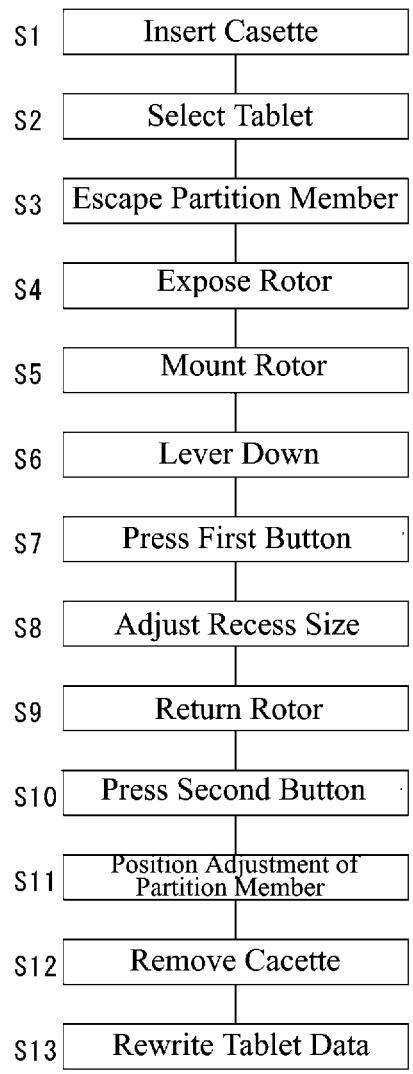

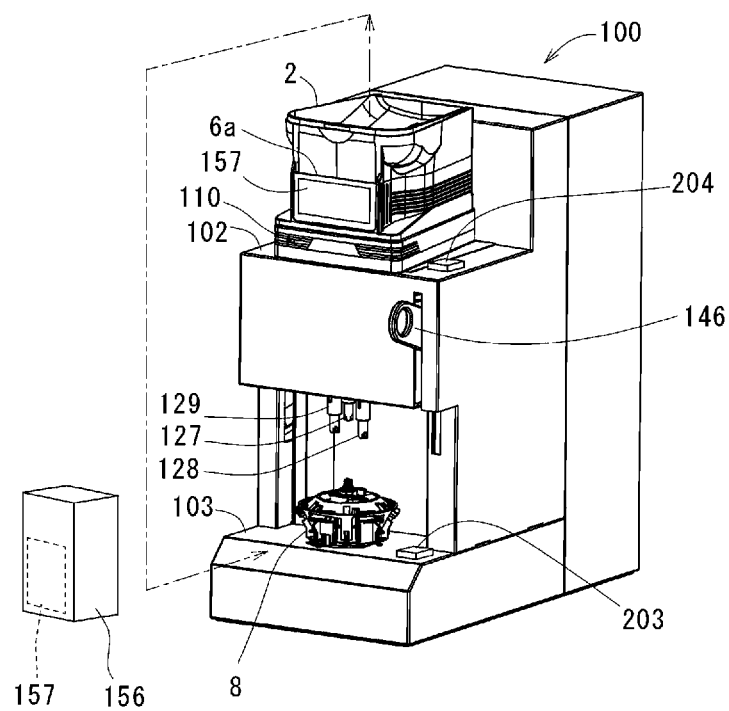
[Fig. 26]

[Fig. 27]
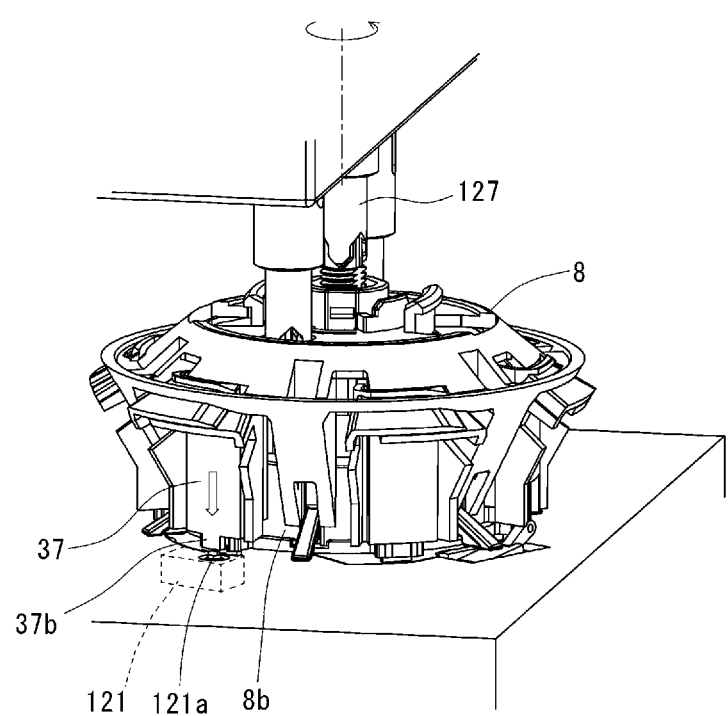

[Fig. 28]
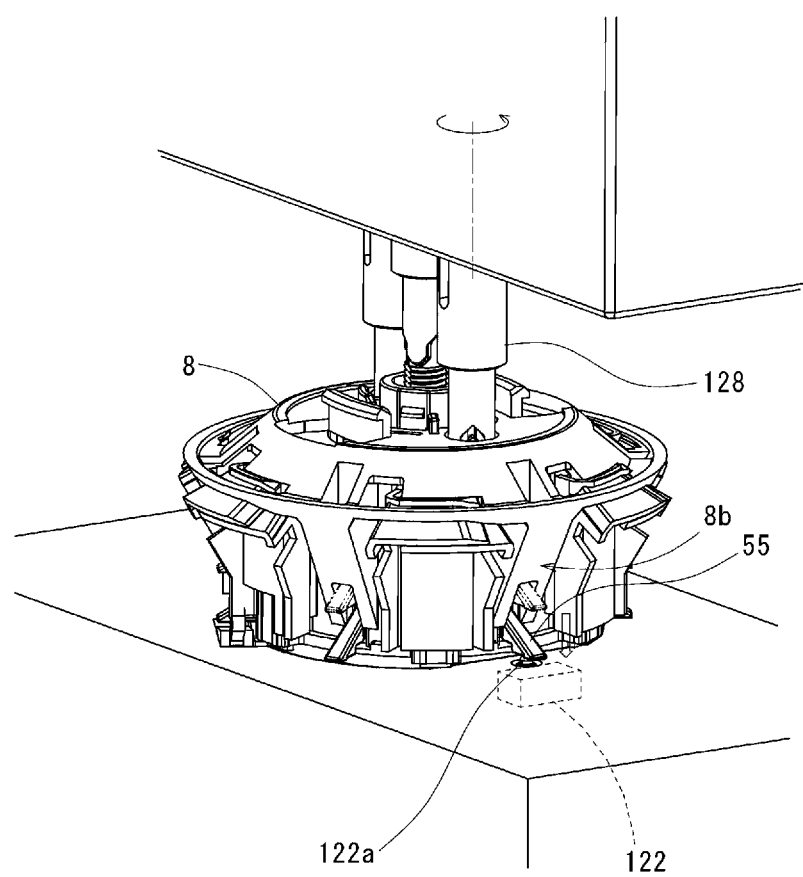

[Fig. 29]
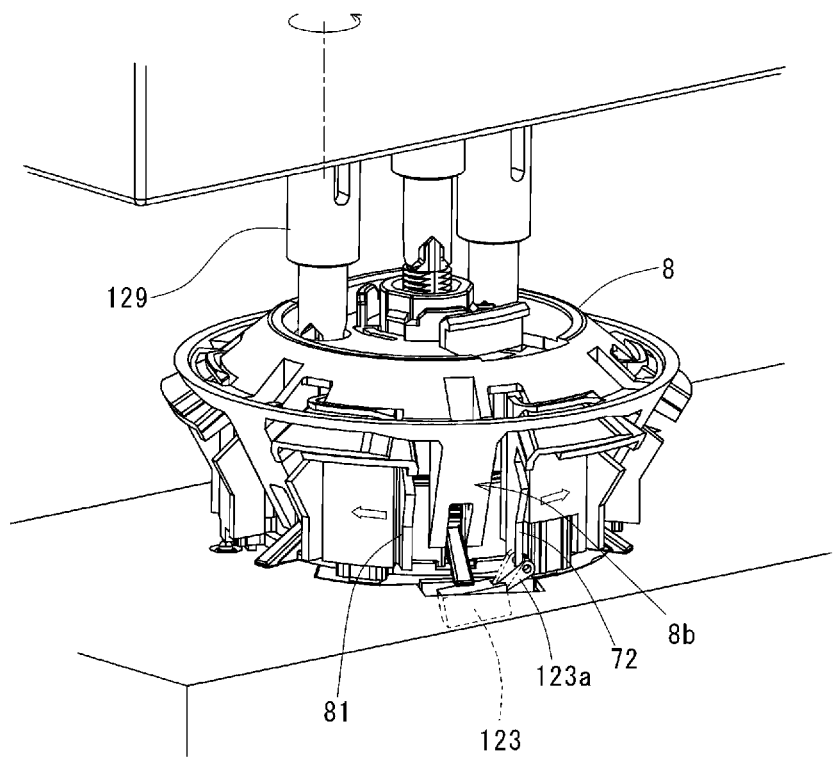
[Fig. 30]
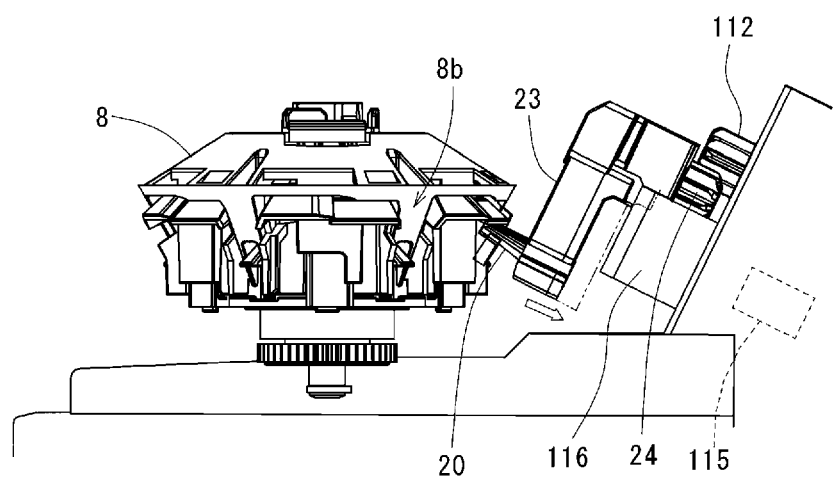

[Fig. 31]
(a)
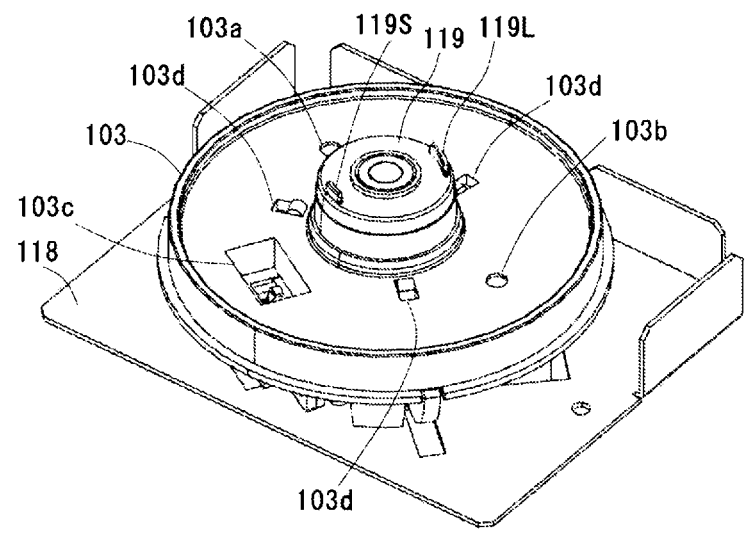
(b)
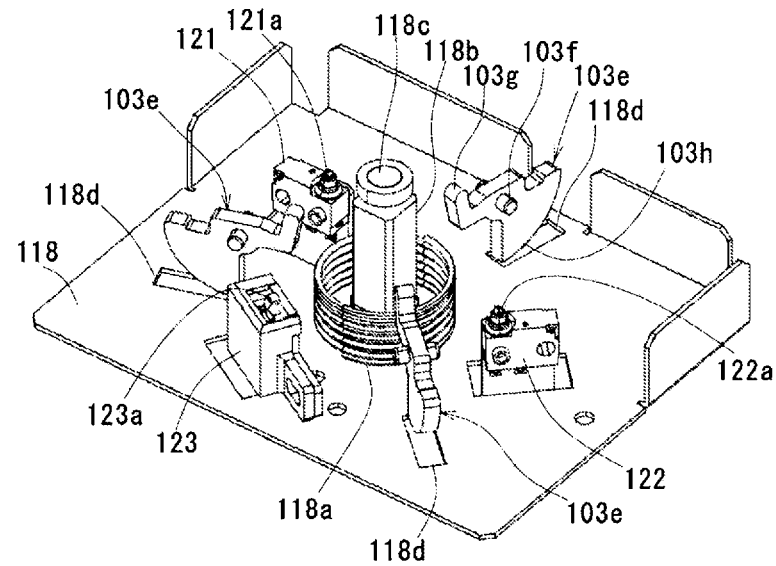

TABLET GUIDE PATH-ADJUSTING DEVICE OF TABLET CASSETTE

RELATED APPLICATIONS

This application is the U.S. National Phase of and claims priority to International Patent Application No. PCT/JP2018/029363, International Filing Date Aug. 6, 2018, entitled Tablet Guide Path-Adjusting Device Of Tablet Cassette; which claims benefit of Japanese Application No. 2017-156797 filed Aug. 15, 2017; and Japanese Application No. 2018-130293 filed Jul. 9, 2018; all of which are incorporated herein by reference in their entireties.

TECHNICAL FIELD

The present invention relates to a tablet guiding path adjusting apparatus for a tablet cassette which receives a number of tablets and discharges tablets according to a prescription. In particular, the present invention pertains to a tablet guiding path adjusting apparatus for a tablet cassette, in accordance with the shape or size of a tablet received into the tablet cassette, which automatically adjusts a dimension, such as depth, height, or width of a recess of a tablet guiding path in a rotor, or an entry position of a partition member that enters the tablet guiding path.

BACKGROUND ART

Tablet storing and dispensing apparatuses installed in pharmacies and hospitals can automatically provide tablets in accordance with prescriptions, promptly, securely, and safely for numerous patients. Tablets have a wide variety of shapes and sizes, e.g., a round shape, an oval shape, a spherical shape, a capsule shape, and a sugar-coated shape, and it is desirable that tablet storing and dispensing apparatuses can dispense as many kinds of tablets as possible.

Tablet storing and dispensing apparatuses include a number of tablet cassettes that can store and dispense different kinds of tablets. Each tablet cassette consists of a cassette body for storing tablets, and a rotor equipped ratably and drivably on the bottom of the cassette body. Once the rotor rotates, tablets within the cassette body are guided in turn to a plurality of tablet guiding paths formed in the rotor; and at the time when each of the tablet guiding paths aligns with a tablet discharging orifice in the cassette body, a partition member separates a tablet at the lowest part of the tablet guiding path from a tablet at the upper part, and then only the tablet at the lowest part is discharged from the tablet discharging orifice.

The applicant has proposed, in Patent Literature 1, a tablet cassette that can change the depth and width of a tablet guiding path in a rotor depending on the types of tablets. The tablet cassette in Patent literature 1 has a movable piece transferring mechanism for transferring, in a radial direction of the rotor, a movable piece that forms a face in the depth direction of the tablet guiding path; a width adjusting mechanism for transferring a first and second movable members having side walls that form faces in the across-the-width direction of the tablet guiding path, relative to the circumferential direction of the rotor; and a tablet partitioning mechanism that has a plurality of tablet holding members provided along the tablet guiding path and presses down any of the tablet holding members by a pressing member to hold a tablet upper than the lowest tablet, thereby discharging only the tablet at the lowest part. The tablet cassette in Patent Literature 1 can adjust the depth and width of the tablet guiding path and the position of a partition, thus allowing for handling tablets with a wide variety of shapes or sizes.

PRIOR ATR LITERATURE

Patent Literature

Patent Literature 1: International Patent Application No. WO2012/096328

SUMMARY OF INVENTION

Problem to be Solved by Invention

Although conventional tablet cassettes have tablet guiding paths of which dimensions can be adjusted by each adjusting mechanism, determination of the dimensions in accordance with a wide variety of the shape or sizes of tablets is complicated and needs skill.

Thus, an object of the present invention is to provide a tablet guiding path adjusting apparatus for a tablet cassette which automatically adjusts a dimension of a tablet guiding path promptly in accordance with the shape or size of a tablet received into the tablet cassette.

Means for Solving Problem

As means to solve such problem, the present invention comprises:

a rotor rotatably equipped within a cassette body and having a tablet guiding path for receiving at least one of tablets received within the cassette body and guiding to a discharging orifice of the cassette body, a partition member, provided on the upper side of the discharging orifice, for entering the tablet guiding path of the rotor and being located between a tablet at the lowest part and a tablet at the upper side thereof, the tablet at the lowest part being present on the tablet guiding path, and a tablet guiding path adjusting mechanism configured to adjust at least either dimension of the depth and width of the tablet guiding path;

the tablet guiding path adjusting apparatus adjusting the tablet guiding path adjusting mechanism in the tablet cassette, wherein the depth of the tablet guiding path is defined by a dimension between the bottom face of a recess of the tablet guiding path and the inner face of the cassette body, and wherein the width of the tablet guiding path is defined by a dimension between both side faces of the tablet guiding path, wherein the tablet guiding path adjusting apparatus engages with an engaging part of the tablet guiding path adjusting mechanism to operate the tablet guiding path adjusting mechanism, and adjusts a dimension of the tablet guiding path in accordance with the shape or size of tablets received within the cassette body.

The tablet guiding path adjusting mechanism is further configure to adjust a dimension of height of the tablet guiding path, wherein the height of the tablet guiding path is defined by a dimension between a tablet support stand located at the lower end of the tablet guiding path and the partition member.

It is preferable to comprise:

a guiding path adjusting member for engaging with an engaging part of the tablet guiding path adjusting mechanism, a guiding path driving part for driving the guiding path adjusting member, and a first zero-point detection part for detecting the zero-point of the tablet guiding path adjusting mechanism; and to drive the guiding path adjusting member by the guiding path driving part; and upon detecting the zero-point of the tablet guiding path adjusting mechanism by the first zero-point detection part, to operate the tablet guiding path adjusting apparatus for the preset amount in accordance with the shape or size of tablets received within the cassette body.

It is preferable to have a first tablet master storage part for storing a dimension of the tablet guiding path suitable for the shape or size of tablets or a numerical value related to the dimension, and to adjust a dimension of the tablet guiding path to the dimension stored in the first tablet master storage part or the numerical value related to the dimension in accordance with the shape or size of the tablets received within the cassette body.

It is preferable that the cassette body have a partition adjusting mechanism for adjusting an entry position of the partition member, and it is preferable to engage with an engaging part of the partition adjusting mechanism to operate the partition adjusting mechanism, and to adjust an entry position of the partition member in accordance with the shape or size of tablets received within the cassette body, or the depth of the tablet guiding path.

It is preferable to comprise:

a partition adjusting member for engaging with the engaging part of the partition adjusting mechanism, a partition driving part for driving the partition adjusting member, and a second zero-point detection part for detecting the zero-point of the partition adjusting mechanism, and to drives the partition adjusting member by the partition driving part, and upon detecting the zero-point of the partition adjusting mechanism by the second zero-point detection part, to position the partition member at a preset entry position in accordance with the shape or size of tablets received within the cassette body, or the depth of the tablet guiding path.

It is preferable to have a second tablet master storage part for storing an entry position of the partition member to the tablet guiding path suitable for the shape or size of tablets or the depth of the tablet guiding path, or a numerical value related to the entry position, and to adjust an entry position of the partition member to the entry position stored in the second tablet master storage part or the numerical value related to the entry position in accordance with the shape or size of the tablets received within the cassette body or the depth of the tablet guiding path.

It is preferable to comprise:

a cassette inserting part for inserting the cassette body, and a rotor mounting part for mounting the rotor removed from the cassette body inserted the cassette inserting part.

It is preferable that after the cassette body is inserted to the cassette inserting part, the partition adjusting member engage with the engaging part, allow the partition driving part to drive the partition adjusting member, and make the partition member evacuate from the tablet guiding path.

It is preferable to comprise a lever for making the guiding path adjusting member descend until the guiding path adjusting member engages with the engaging part of the rotor mounted at the rotor mounting part.

Advantageous Effect of Invention

According to the present invention, a dimension of a tablet guiding path such as depth, thickness, and height can be automatically adjusted promptly in accordance with the shape or size of tablets.

BRIEF DESCRIPTION OF DRAWINGS

FIG. 1 shows a perspective view of a tablet storing and removing apparatus that includes tablet guiding path adjusting apparatus.

FIG. 2 shows a perspective view of a tablet cassette and base.

FIG. 3 shows a perspective view of the tablet cassette without a lid.

FIG. 4 shows a bottom perspective view of the tablet cassette.

FIG. 5 shows a cross-sectional view of a cassette body.

FIG. 6 shows a perspective view of the tablet cassette without a rotor.

FIG. 7 shows an exploded perspective view of a rotor driving part in the cassette body.

FIG. 8A shows an exploded perspective view of a partition adjusting mechanism in the cassette body.

FIG. 8B shows a cross-sectional view of the cassette body showing an entry position of a partition member.

FIG. 9 shows a whole perspective view of the rotor.

FIG. 10 shows a bottom perspective view of the rotor.

FIG. 11 shows an exploded perspective view of a depth adjusting mechanism.

FIG. 12 shows an exploded perspective view of a height adjusting mechanism.

FIG. 13 shows an exploded perspective view of a width adjusting mechanism.

FIG. 14 shows a cross-sectional view illustrating depth adjustment by the depth adjusting mechanism.

FIG. 15 shows a cross-sectional view illustrating height adjustment by the height adjusting mechanism.

FIG. 16 shows a plan view (a) and a bottom view (b) of a movable member and a width adjusting member width adjusting mechanism which illustrates width adjustment.

FIG. 17 shows a perspective view of the tablet guiding path adjusting apparatus.

FIG. 18 shows a front perspective view of the inside of the tablet guiding path adjusting apparatus.

FIG. 19 shows an inner side view of the tablet guiding path adjusting apparatus.

FIG. 20 shows a plan view of the rear frame of the tablet guiding path adjusting apparatus.

FIG. 21 shows a plan view of a sensor attaching stand of the tablet guiding path adjusting apparatus.

FIG. 22 shows an exploded perspective view of an adjusting shaft.

FIG. 23 shows a rear perspective view of the inside of the tablet guiding path adjusting apparatus.

FIG. 24 shows a control system diagram of the tablet guiding path adjusting apparatus.

FIG. 25 shows a control flowchart of the tablet guiding path adjusting apparatus.

FIG. 26 shows a perspective view showing the tablet guiding path adjusting apparatus inserted with the tablet cassette and the rotor.

FIG. 27 shows a partially enlarged perspective view showing depth adjustment by the tablet guiding path adjusting apparatus.

FIG. 28 shows a partially enlarged perspective view showing height adjustment by the tablet guiding path adjusting apparatus.

FIG. 29 shows a partially enlarged perspective view showing width adjustment by the tablet guiding path adjusting apparatus.

FIG. 30 shows a partially enlarged side view showing adjustment of an entry position of the partition member by the tablet guiding path adjusting apparatus.

FIG. 31 shows a perspective view (a) which depicts a modification example of the rotor mounting part and the sensor attaching stand in the tablet guiding path adjusting apparatus and a perspective view (b) which depicts a state where the rotor mounting part is removed.

EMBODIMENT FOR PRACTICING INVENTION

Hereinafter, embodiments of the present invention will be described with reference to the attached drawings.

FIG. 1 shows a tablet storing and dispensing apparatus 1 that can dispense a tablet(s) with the type and number according to a prescription. The tablet storing and dispensing apparatus 1 has a number of tablet cassettes 2 removably disposed onto each of the bases 3. On a stand 4 of the tablet storing and dispensing apparatus 1, a tablet guiding path adjusting apparatus 100 according to the present invention is disposed. The following description will be given for the structure of the tablet cassette 2 at first, and subsequently for the tablet guiding path adjusting apparatus 100. Incidentally, "tablet" referred in the present invention includes, in addition to a tablet in a narrow sense, drugs dispensable by the tablet cassette 2 such as capsules and sugar-coated tablets.

FIG. 2 shows the tablet cassette 2 and the base 3 thereof to be inserted in the tablet storing and dispensing apparatus 1. The tablet cassette 2 consists of a cassette body 5, a lid 6 for opening and closing and removably covering the upper opening of the cassette body 5, a skirt part 7 disposed at the bottom of the cassette body 5, and a rotor 8 received by the cassette body 5 as shown in FIG. 3.

The top face of the lid 6 and the front face of the skirt part 7 has pockets 6a and 7a formed for receiving a label or a card that identifies a tablet(s) received in the tablet cassette 2. As shown in FIG. 4, the inner side face of the skirt part 7 has a slide part 7b for slidably contacting with an inserting guide 3a of the base 3 shown in FIG. 2, and an elastic engaging piece 7c for engaging with a seizing part 3b of the inserting guide 3a.

<Structure of Cassette Body>

As shown in FIG. 5, the cassette body 5 is composed of an upward-opening rectangular upper part 5a, an inverted-corn-shaped sloping part 5b, a cylindrical tubular part 5c, and a bottom part 5d. The inner space from the bottom part 5d to the sloping part 5b receives the rotor 8, as well as allows a number of tablets to be received upward from the rotor 8. From the bottom of the sloping part 5b to the bottom part 5d, a tablet discharging orifice 9 is formed. The tablet discharging orifice 9 communicates to tablet discharging path 3c formed in the base 3 shown in FIG. 2. To the outside of the cassette body 5, a partition member 20 and a partition adjusting mechanism M1 mentioned later for adjusting the position of the partition member 20. The tip of the partition member 20 is inserted inside from the outside of the sloping part 5b via a slit 9a formed at the upper side of the tablet discharging orifice 9 as shown in FIG. 6. In the center of the bottom part 5d, a rotor shaft orifice 11 is formed for receiving the rotor driving part 10 shown in FIG. 6.

<Rotor Driving Part>

As shown FIG. 7, a rotor driving part 10 is composed of a driving shaft 12 that penetrates through a rotor shaft orifice 11; an engaging shaft 13 that engages with the upper end of the driving shaft 12 and rotates with mating to the driving shaft 12; a drive gear 14 that engages with the lower end of the driving shaft 12 and rotates with mating to the driving shaft 12; engaging shaft 13; and a central shaft 15 that penetrates through and integrates the driving shaft 12 and the drive gear 14. The engaging shaft 13 consists of a round base part 13a that directly contacts with the upper end face of the driving shaft 12; engaging pieces 13b that project downward from the outer peripheral edge of the base part 13a and are located at the six-equal circumferential parts; and a linking part 13c that links the lower ends of the neighboring engaging pieces 13b. The inner faces of the engaging piece 13b and the linking part 13c is slidably disposed via a ring 16 on the peripheral face of a circular protrusion 11a disposed on the edge of the rotor shaft orifice 11. When the rotor 8 is inserted, the engaging piece 13b engages with a slit 44a between engaging pieces 44 of an engaging concave part 41a of the rotor 8 shown in FIG. 10, and transmits rotation force of the rotor driving part 10 to the rotor 8. Furthermore, the rotor 8 may have various sizes, and in order to prevent the rotor 8 from mismounting on the rotor driving part 10 of the cassette body 5, the number of engaging pieces 13b and the slits 44a may be 6, 5, or 4 in accordance with the size of the rotor 8. On the upper end of the central shaft 15, collars 15a and an orifice 15b are formed. The central shaft orifice 15b has circular magnets 15c inserted as stacked three pieces and fixed with a screw 15d. The magnet 15c may take a single cylinder shape. The lower end of the central shaft 15 penetrates a gear cover 17 attached to the bottom part 5d of the cassette body 5 shown in FIG. 4 and is retained by C-shaped stopper ring 15c. The drive gear 14 engages with the motor gear 3d of the base 3 shown in FIG. 2 via an intermediate gear 18 in FIG. 4 so as to be driven.

On the drive gear 14, a seizing pawl 19a at one end of the seizing lever 19 disposed at the bottom face of the cassette body 5 is seized as shown in FIG. 4. An operating part 19b at the other end of the seizing lever 19 extends in the inserting direction of the tablet cassette 2. When the tablet cassette 2 is inserted into the base 3, the operating part 19b of the seizing lever 19 directly contacts with the predetermined direct contact part 3e of the base 3 shown in FIG. 2 and rotates the seizing lever 19 against biasing force of the spring 19c; the seizing pawl 19a leaves the drive gear 14; and thus the drive gear 14 becomes possible to rotatably drive. Moreover, when the tablet cassette 2 is drawn from the base 3, the operating part 19b of the seizing lever 19 leaves the direct contact part 3e of the base 3; the seizing lever 19 rotates by biasing force of the spring 19c the seizing pawl 19a is seized on the drive gear 14; and thus rotation of the drive gear 14 becomes prevented. As a result, it is possible to prevent a tablet(s) T from dropping by unintentional rotation of the rotor 8 in the tablet cassette 2 drawn.

<Partition Adjusting Mechanism>

As shown in FIG. 8a, the partition member 20 is formed in a comb shape convexly bent upward. The partition member 20 can move back and forth relative to the rotor 8 by a partition adjusting mechanism M1. The partition adjusting mechanism M1 consists of a first fixture member 21, a second fixture member 22, a movable member 23, and an adjusting member 24.

In the center of the first fixture member 21, an upper-case part 21a is formed which receives a slide part 23c of a movable member 23 and a stopper 28. On the both sides of the upper-case part 21a of the first fixture member 21, an attachment orifice 21b is formed. On the bottom face of the first fixture member 21, a pair of elastic pieces 21c are formed which press and stabilize a movable member 23. At the tip of the elastic piece 21c, a protruded part 21d is formed which engages with recess 23d of the movable member 23.

In the center of the second fixture member 22, a bottom case part 22b is formed which receives the slide part 23c of the movable member 23 and the stopper 28. At the lower end of both side of the bottom case part 22a of the second fixture member 22, inverted U-shaped notches 22b are formed. Upon combined with each other, the upper case part 21a of the first fixture member 21 and the bottom case part 22a of the second fixture member 22 form a downward-opening movable member receiving part 25 that receives the slide part 23c of the movable member 23, and a stopper receiving part 26 that receives a stopper 28. In the lower edge of the upper-case part 21a and the upper edge of the bottom case part 22a in the movable member receiving part 25, a half-round notch 27 is formed which sustains both axial ends of the adjusting member 24 so as not to axially move.

In the movable member 23, a retaining part 23a that retains the partition member 20 is formed at the lower end, and a slide part 23c having a screw orifice 23b is formed at the upper end. On both edges of the upper face of the movable member 23, the recesses 23d are formed.

An adjusting member 24 has a screw part 24a that screws with the screw hole 23b of the slide part 23c of the movable member 23, and an engaging gear 24b. To the engaging gear 24b, the stopper 28 can seize to be fixed in the position required. The recess 23d of the movable member 23 and the protruded part 21d of the first fixture member 21 engage and thus fix the movable member 23 to the rotation direction of the adjusting member 24, and therefore, upon rotation of the adjusting member 24, the movable member 23 will move in the axial direction of the adjusting member 24.

To assemble the partition adjusting mechanism M1, at first, the slide part 23c of the movable member 23 is received from the underneath into the bottom case part 22a of the second fixture member 22; the adjusting member 24 is made to screw into the slide part 23c to make pass through; and then both ends of the adjusting member 24 are mounted onto a notch 27 of the bottom case part 22. Moreover, the bottom case part 22a of the second fixture member 22 receives the stopper 28. At this state, the second fixture member 22 is superposed on the first fixture member 21 such that the adjusting member 24 passes through an orifice formed by the first fixture member 21 and the notch 27 of the second fixture member, a pawl 22f of the elastic seizing piece 22e disposed in the upper case part 21a seizes the lower edge of the bottom case part 22a to be integrated therewith. Additionally, since the size of the notch 27 is smaller than that of the engaging gear 24b, the engaging gear 24b is fixed to the upper case part 22a and the bottom case part 22b so as not to move axially. Subsequently, fixing screws 29 are passed through the notch 22b of the second fixture member 22 and the attachment orifice 21b of the first fixture member 21 and is screwed into screw holes 5e on the back face of the cassette body 5, thereby fixing to the cassette body 5.

Upon rotation of the adjusting member 24 of the partition adjusting mechanism M1, the slide part 23c moves within the upper case part 21a of the first fixture member 21 and the movable member receiving part 25 of the bottom case 22b of the second fixture member 22, and therefore, as shown in FIG. 8b, the partition member 20 held at the movable member 23 goes forth or back toward the rotor 8 within the cassette body 5, thereby providing adjustment of a tip position 20a of the partition member 20. In other words, as shown in FIG. 8B(a), if the tablet T has high thickness, a rotor body 31 of the rotor 8 is lifted, as described in detail later, to enlarge the depth D of a recess of a tablet guiding path 8b between a lower sloping outer face 35c and the sloping part 5b of the cassette body 5, while also making the tip of the partition member 20 go forth toward the rotor 8. As shown in FIG. 8b(b), if the tablet T has low thickness, a rotor body 35 of the rotor 8 is lowered to lessen depth D of the recess of the tablet guiding path 8b between the lower sloping outer face 35c and the sloping part 5b of the cassette body 5, while also making the tip of the partition member 20 go back from the rotor 8.

<Entire Structure of Rotor>

The rotor 8 generally has, as shown in FIGS. 9 and 10, a conical shape on the top face, an inverted-conical shape on the side face, and a flat shape on the bottom face. On the upper part of the side face of the rotor 8, tablet pockets 8a are circumferentially disposed, a plurality of tablet guiding paths 8b extending downwardly from the tablet pocket 8a are circumferentially disposed at equal distances.

The tablet pocket 8a is defined by the peripheral face of a rotor body 35 described later, a first horizontal protruded piece 73 of a first movable member 60 and a second horizontal protruded piece 82 of a second movable member 61 described later, with surrounded by the sloping part 5b of the cassette body 5 allowing to receive tablets T accommodated in the cassette body 5 while arranging them circumferentially.

The tablet guiding path 8b is defined to a recess shape by the lower sloping outer face 35c of the rotor body 35 described later, a first vertical protruded piece 72 of the first movable member 60 described later, a second vertical protruded piece 81 of the second movable member 61 described later, and a tablet support stand 55 of a circular elevator member 51 described later; is covered with the sloping part 5b of the cassette body 5 and receives the tablets T arranged in the tablet pocket 8a while guiding them downward.

The tablet guiding path 8b is needed to adjust the depth, height, and width of a recess in accordance with the shape or size of the tablet received in the tablet cassette such that the tablet smoothly passes through the tablet guiding path 8b and is discharged from the tablet discharging orifice 9 as shown in FIG. 5. Here, The "depth" of the recess of the tablet guiding path 8b is a dimension in the thickness direction of the tablet passing through the tablet guiding path 8b, and represents a dimension D between the sloping part 5b of the cassette body 5 and the lower sloping outer face 35c of the downwardly protruded part 35 of the rotor body 31. The "height" of the recess is a dimension in the height direction of the tablet passing through the tablet guiding path 8b, and represents a dimension H between the partition member 20 and the tablet support stand 55 of the circular elevator member 51 of the rotor 8. The "width" of the recess is a dimension in the width direction of the tablet passing through the tablet guiding path 8b, and represents a dimension W between the first vertical protruded piece 72 of the first movable member 60 and the second vertical protruded piece 81 of the second movable member 61.

To adjust the shape of a recess of the tablet guiding path 8b, the rotor 8 has a depth adjusting mechanism M2, a height adjusting mechanism M3, and a width adjusting mechanism M4. Hereinafter, these will be described in turn.

<Depth Adjusting Mechanism>

FIG. 11 depicts members composing the depth adjusting mechanism M2. The depth adjusting mechanism M2 is composed of a rotor cover 30, a rotor body 31, a rotor base 32, and a depth adjusting member 33.

The rotor cover 30 wholly has an umbrella shape. The top face of the rotor cover 30 is formed in a conical shape.

The rotor body 31 has a round-shaped base part 34, a downwardly protruded part 35, a circular part 36, and a guiding part 37.

The base part 34 has a shaft part 38 disposed in the center, and the shaft part 38 is formed with a screw hole (not shown). On the top surface of the base part 34, two holes 34a and 34b are formed for making a height adjusting member 52 and a width adjusting member 64 expose as described later.

The downwardly protruded parts 35 extend downwardly from six-equal positions on the outer peripheral edge of the base part 34. The downwardly protruded part 35 consists of a vertical inner face 35a, a top sloping outer face 35b slanting downwardly and outwardly from the outer peripheral edge of the base part 34, the lower sloping outer face 35c slanting downwardly and inwardly from the lower end of the top sloping outer face 35b, and both side faces 35d, and is formed in a triangular shape viewed from a lateral side. The lower sloping outer face 35c forms the bottom face of the recess of the tablet guiding path 8b. On the lower end of the downwardly protruded part 35, a slit 35e is formed.

The circular part 36 is concentrically formed outside the base part 34, and connected to the base part 34 via the downwardly protruded parts 35.

The guiding parts 37 extend between the downwardly protruded parts 35 from six-equal positions on the outer peripheral edge of the base part 34. On both side of the inner face of the guiding part 37, guide edges 37a for engaging slidably a guiding piece 40 of the rotor base 32 are formed as described later. By engaging the guiding piece 40 and the guide edges 37a, the rotor body 31 and the rotor base 32 rotate integrally. At the lower end of any one of the guiding part 37 of the six guiding parts 37, a protrusion 37b is formed, which is served as a detection part for detecting a zero-point.

The rotor base 32 has a circular base part 39, a guiding piece 40, and an engaging part 41.

The base part 39 has a circular wall 42 formed on the top face. In the circular wall 42, vertical slits 42a extending axially are formed on six-equal circumferential positions.

The guiding pieces 40 are located at six-equal circumferential positions on the outer peripheral edge of the base part 39, as well as upwardly projects between neighboring vertical slits 42a. The guiding piece 40 is formed so as to slidably engage with the guide edges 37a of the guiding part 37 of the rotor body 31. Between the guiding piece 40 and the circular wall 42, a stiffening rib 43 is disposed.

The engaging part 41 has engaging pieces 44 standing upwardly from six-equal circumferential positions on the inner peripheral edge of the base part 39, and a round protruded part 45 disposed on the upper end of the engaging piece 44. The engaging part 41 forms, as viewed from the reverse side, an engaging concave part 41a with which the engaging rotor driving part 10 engages, as shown in FIG. 10. With the slit 44a between the neighboring engaging pieces 44, the engaging piece 13b of the rotor driving part 10 engages. Inside the round protruded part 45, a magnetic plate 46 is embedded, which adheres to a magnet 15c disposed in the central shaft 15 of the rotor driving part 10. In the center of the top face of the round protruded part 45, the depth adjusting member 33 is sustained. In the round protruded part 45, the hole 45a for receiving a stopper 48 preventing free rotation of the depth adjusting member 33 and two screw holes 45b for screwing a screw (not shown) inserted through two holes of screw inserting holes 93 of a second support member 63 described later are formed.

Between the round protruded part 45 and the circular wall 42, a circular concave part 47 is formed, which receives the height adjusting mechanism M3 described later.

The depth adjusting member 33 has a male screw part 33a and a gear part 33b at a lower end. The male screw part 33a screws with a screw hole (not shown) of the shaft part 38 of the rotor body 31, and the gear part 33b at the lower end is sustained by the round protruded part 45 of the rotor base 32. At an upper end of the male screw part 33a, the engaging part 33c is formed, protruded and exposed from the shaft part 38 of the rotor body 31, and is rotatably adjustable from the outside. Between the teeth of the gear part 33b, the tip of the stopper 48 consisting of an elastic piece is seized.

In the depth adjusting member 33, the gear part 33b is restricted to move axially by a first support member 62 and the rotor base 32, and a guide edge 37a of the rotor body 31 also engages with the guiding piece 40 of the rotor base 32, thereby restricting the rotor body 31 to rotate against the rotor base 32. Thus, as the depth adjusting member 33 is rotated without rotation of the rotor base 32, the rotor body 31 having an undepicted screw hole screwed to the male screw part 33a of the depth adjusting member 33 moves upward and downward in a direction of a rotation axis of the rotor 4. Accompanied with this, the lower sloping outer face 35c of the downwardly protruded part 35 in the rotor body 31 forming the bottom face of the tablet guiding path 8b also moves upward and downward.

Referring to FIG. 14, the lower sloping outer face 35c of the downwardly protruded part 35 slants radially from the outside to the inside as going from the top to the bottom, and stands parallel to the inverted-conical sloping part 5b of the cassette body 5. Thus, as the lower sloping outer face 35c of the downwardly protruded part 35 in the rotor body 31 moves downward, the distance between the lower sloping outer face 35c of the downwardly protruded part 35 and the conical sloping part 5b of the cassette body 5 decreases, thus allowing the depth of the tablet guiding path 8b to become shallower (D1). In contrast, as the lower sloping outer face 35c of the downwardly protruded part 35 of the rotor body 31 moves upward, the distance between the lower sloping outer face 35c of the downwardly protruded part 35 and the inverted-conical sloping part 5b of the cassette body 5 increases, thus allowing the depth of the tablet guiding path 8b to become deeper (D2). In this manner, rotation of the depth adjusting member 33 to right or left allows for adjustment of the depth of tablet guiding path 8b in accordance with the thickness of the tablet T passing through the tablet guiding path 8b. Additionally, since in every rotation of the depth adjusting member 33 of the gear part 33b shown in FIG. 11, the tip of the stopper 48 rides over a tooth and engages between teeth of the gear part 33b, the depth adjusting member 33 can be stopped at an appropriate position to fix the rotor body 35 at a position of desired height.

<Height Adjusting Mechanism>

FIG. 12 depicts members composing the height adjusting mechanism M3. The height adjusting mechanism M3 is composed of a tubular rotating member 50, a circular elevator member 51, and a height adjusting member 52.

In the tubular rotating member 50, a male screw part 50a is formed at the outer peripheral lower part, and a follower gear 50b is formed at the inner peripheral upper part. With the follower gear 50b, the stopper 53 for preventing free rotation of the tubular rotating member 50 is engaged.

In the circular elevator member 51, arms 54 are disposed radially and protrudingly with the protrusions at six-equal positions on the inner periphery, and at the tip of each of the arms 54, the tablet support stand 55. The tablet support stand 55 inclines perpendicularly to the tablet guiding path 8b so that a tablet T at the lowest position within the tablet guiding path 8b can be sustained. On the inner face of the circular elevator member 51, a female screw part 51a is formed, which screws with the male screw part 50a of the tubular rotating member 50.

The height adjusting member 52 has a drive gear 52a at the lower end, which meshes with the follower gear 50b of the tubular rotating member 50. At the upper end of the height adjusting member 52, an engaging part 52b is formed while protruding and being exposed from a top face orifice 34a of the base part 34 of the rotor body 3 for making adjustable rotatably from the outside. The height adjusting member 52 is retained at the edge of a hole 90 in the second support member 63 described later so as not to move in a vertical direction.

The tubular rotating member 50 and the circular elevator member 51 are received in the screwed condition with each other into the circular concave part 47 of the rotor base 32; the arms 54 of the circular elevator member 51 are slidably inserted into the slits 42a of the circular wall 42 in the rotor base 32; and the tablet support stand 55 protrudes to the outside of the circular wall 42 in the rotor base 32 so as to sustain a tablet T at the lowest position within the guiding path 8b.

As shown in FIG. 15, in order to adjust the height H of the tablet guiding path 8b corresponding to the height of a tablet T, the height adjusting member 52 in the height adjusting mechanism M3 is rotated to right or left. In the present invention, the partition member 20 is fixed in a height direction relative to the cassette body 5, and therefore, in order to adjust the height H of the tablet guiding path 8b, instead of the partition member 20 itself being moved, the tablet support stand 55 at the lower part of the partition member 20 is moved up/down to adjust the distance between the partition member 20 and the tablet support stand 55, thereby adjusting the height H from the tablet support stand 55 of the tablet guiding path 8b to the partition member 20.

As the height adjusting member 52 rotates, the tubular rotating member 50 rotates. The tubular rotating member 50 is restricted in vertical movement by the second support member 63 and the rotor base 32. The circular elevator member 51 having the female screw part 51a for screwing with the male screw part 50a of the tubular rotating member 50 includes the arms 54 passing through the slit 42a of the circular wall 42 in the rotor base 32, and thus is restricted in rotation. Consequently, the rotation of the tubular rotating member 50 causes the circular elevator member 51 to move up and down and thus the tablet support stand 55 of the circular elevator member 51 moves up and down.

In other words, as shown in FIG. 15, as the tubular rotating member 50 rotates to one side, the tablet support stand 55 of the circular elevator member 51 moves upward such that a position of the partition member 20 relative to the tablet support stand 55, i.e., height, becomes lower (H1). In contrast, the tubular rotating member 50 rotates to the other side, the tablet support stand 55 of the circular elevator member 51 moves downward such that a position of the partition member 20 relative to the tablet support stand 55, i.e., height, becomes higher (H2). Additionally, since in every rotation of the tubular rotating member 50 generated by rotation of the height adjusting member 52, the tip of the stopper 53 rides over a tooth and engages between teeth of the follower gear 50b of the tubular rotating member 50, the height adjusting member 52 can be stopped at an appropriate position to fix the tablet support stand 55 at a position of desired height.

<Width Adjusting Mechanism>

FIG. 13 depicts members composing the width adjusting mechanism M4. The width adjusting mechanism M4 consists of the first movable member 60, the second movable member 61, the first support member 62, the second support member 63, and the width adjusting member 64.

As shown in FIG. 13, although the first movable member 60 consists of an upper member 60a and a lower member 60b, an engaging protruded part 65 of the upper member 60a and an engaging protruded part 66 of the lower member 60b engage together, thereby making it possible to rotate both integrally.

In the upper member 60a of the first movable member 60, a nearly half-round notch 68 and a long orifice 69 are adjacently formed on the inner periphery of a circular base part 67. As viewed from above, to the first movable member 60 on edges of the notch 68 facing opposite to the center of the notch 68, an A-protrusion 68a facing opposite to the circumferential direction of the first movable member 60, and a B-protrusion 68b are formed. The A-protrusion 68a and the B-protrusion 68b becomes cam followers for slidably contacting with an A-cam 94a and a B-cam 94b of a first adjusting shaft 94 described later.

The lower member 60b of the first movable member 60 has an annular base part 70, and six of wall parts 71, first vertical protruded pieces 72, and first horizontal protruded pieces 73. The six wall parts 71 protrude downwardly from six-equal circumferential positions on the peripheral edge of the base part 70. The first vertical protruded piece 72 protrudes, as viewed from the front of the wall part 71, outwardly from the left side end, and forms the right side face of the tablet guiding path 8b described above. In the first vertical protruded piece 72, a notch 72a into which the partition member 20 is inserted is formed. The first horizontal protruded piece 73 extends circumferentially and horizontally from the upper end of the first vertical protruded piece 72 to the right hand, as viewed from the front to form the bottom face of the tablet pocket 8a described above.

The second movable member 61 consists of, as similar to the first movable member 60, an upper member 61a and a lower member 61b, an engaging protruded part 74 of the upper member 61a and an engaging protruded part 75 of the lower member 61b engage together, thereby making it possible to rotate both integrally.

In the upper member 61a of the second movable member 61, a nearly half-round notch 77 and a long orifice 78 are adjacently formed on the inner periphery of a circular base part 76. As viewed from above, the second movable member 61 on edges of the notch 77 facing opposite to the center of the notch 68, an A-protrusion 77a facing to the circumferential direction of second movable member 61, and a B-protrusion 77b are formed. The A-protrusion 77a and the B-protrusion 77b becomes cam followers for slidably contacting with an A-cam 95a and a B-cam 95b of a second adjusting shaft described later.

The lower member 61b of the second movable member 61 has an annular base part 79, and six of wall parts 80, second vertical protruded piece 81, and second horizontal protruded piece 82. The six wall parts 80 protrude downwardly from the six-equal circumferential positions on the peripheral edge of the base part 79. The second vertical protruded piece 81 protrudes, as viewed from the front of the wall part 80, outwardly from the left side end, and forms the left side face of the tablet guiding path 8*b* described above. In the second vertical protruded piece 81, a notch 81*a* into which the partition member 20 is inserted is formed. The second horizontal protruded piece 82 extends circumferentially and horizontally from the upper end of the second vertical protruded piece 81 to the left side as viewed from the front, and forms, together with the first horizontal protruded piece 73 in the first movable member 60, the bottom face of the tablet pocket 8*a* described above. The tip of the second horizontal protruded piece 82 in the second movable member 61 is formed so as to overlap under the tip of the first horizontal protruded piece 73 in first movable member 60.

The first support member 62 has a round shape with an outer diameter larger than the inner diameter of the upper member 60*a* of the first movable member 60, and has a round protruded part 83 on the lower face. In the center of the first support member 62, holes 84 and 84*a* passed through by the width adjusting member 64 described later; a hole 85 passed through by depth adjusting member 33 in the depth adjusting mechanism M2; a hole 86 passed through by the height adjusting member 52 in the height adjusting mechanism M3; and two screw inserting holes 87 are formed.

The second support member 63 has a round shape with an outer diameter larger than the inner diameter of the upper member 60*a* of the first movable member 60, and on the top face, a circular protruded part 88 is formed to which the round protruded part 83 of the first support member 62 is fit. In the center of the second support member 63, a hole 89 passed through by the depth adjusting member 33 in the depth adjusting mechanism M2; the hole 90 and a notch 90*a* passed through the height adjusting member 52 in the height adjusting mechanism M3; a hole 91*a* passed through the first adjusting shaft 94 of the width adjusting member 64 described later; a hole 91*b* fit with the second adjusting shaft 95; two screw holes 92 screwed by undepicted screws inserted into two screw inserting holes 87 of the first support member 62, and two screw inserting holes 93 are formed.

An undepicted screw is inserted and screwed from the screw inserting hole 87 of the first support member 62 to the screw hole 92 of the second support member 63, thereby integrating the first support member 62 and the second support member 63 with interposing the first movable member 60 and the second movable member 61.

Moreover, an undepicted screw is inserted and screwed from the screw inserting hole 93 of the second support member 63 to the screw hole 45*b* of the rotor base 32, thereby fixing the second support member 63 to the rotor base 32, as well as holding the tubular rotating member 50 of the height adjusting mechanism M3 between the second support member 63 and the rotor base 32, thus restricting axial movement.

The width adjusting member 64 is defined by the first adjusting shaft 94 and the second adjusting shaft 95. The first adjusting shaft 94 is located within the notch 68. The second adjusting shaft 95 is located within a long hole 69. In the second adjusting shaft 95, a stopper 96 is disposed, which prevents free rotation of the width adjusting member 64.

In the first adjusting shaft 94, an A-cam 94*a*, a B-cam 94*b*, and a gear 94*c* are formed in turn from the upper end. The A-cam 94*a* is formed, as shown in FIG. 16, so as to increase the radius of a cam face in a range of 360° clockwise as viewed from above the width adjusting member 64, thereby slidably contacting with an A-protrusion 68*a* of a first movable plate 60. The B-cam 94*b* is formed so as to increase the radius of a cam face in a range of 360° counterclockwise as viewed from above the width adjusting member 64, thereby slidably contacting with a B-protrusion 68*b* of a first movable plate 60. The maximum radius part of the A-cam 94*a* and the maximum radius part of the B-cam 94*b* are located 180° apart. The upper end of the first adjusting shaft 94 is held by the hole 84*a* of first support member 62, and the lower end is held by the hole 91*a* of the second support member 63.

Similarly, in the second adjusting shaft 95, an A-cam 95*a*, a B-cam 95*b*, a gear 95*c*, and an engaging part 95*d* are formed in turn from the lower end. The A-cam 95*a* is formed so as to increase the radius of a cam face in a range of 360° clockwise as viewed from below the width adjusting member 64, thereby slidably contacting with an A-protrusion 77*a* of a second movable member 61. The B-cam 95*b* is formed so as to increase the radius of a cam face in a range of 360° counterclockwise as viewed from below the width adjusting member 64, thereby slidably contacting with a B-protrusion 77*b* of a second movable plate 61. The maximum radius part of the A-cam 95*a* and the maximum radius part of the B-cam 95*b* are located 180° apart. The gear 95*c* of the second adjusting shaft 95 is configured to engage and moved together with the gear 94*c*. The upper end of the second adjusting shaft 95 passes through the hole 69 of the first support member 62, protrudes from rotor body 31 to expose itself from the hole 34*a*, and is rotatably adjustable from the outside. The lower end of the second adjusting shaft 95 is held by the hole 91*b* of the second support member 63. Additionally, the upper end of the first adjusting shaft 94 may pass through the first support member 62, protrude to be exposed from the rotor body 35, and be rotatably adjustable from the outside.

When the second adjusting shaft 95 is rotated clockwise in FIG. 16(*a*), rotational force is transmitted from the gear 95*c* of the second adjusting shaft 95 to the gear 94*c* of the first adjusting shaft 94, thereby allowing the first adjusting shaft 94 to rotate counterclockwise. The rotation of the first adjusting shaft 94 causes the A-cam 94*a* of the first adjusting shaft 94 to slidably contacts with and presses the A-protrusion 68*a* of the first movable member 60, thus allowing the first movable member 60 to rotate clockwise in FIG. 16(*a*). Meanwhile, as shown in FIG. 16(*b*), the rotation of the second adjusting shaft 95 causes the A-cam 95*a* of the second adjusting shaft 95 to slidably contacts with and presses the A-protrusion 77*a* of the second movable member 61, thus allowing the second movable plate 61 to rotate clockwise in FIG. 16(*b*) and counterclockwise in FIG. 16(*a*).

Subsequently, when the second adjusting shaft 95 is rotated counterclockwise in FIG. 16(*a*), rotary force is transmitted from the gear 95*c* of the second adjusting shaft 95 to the gear 94*c* of the first adjusting shaft 94, thereby allowing the first adjusting shaft 94 to rotate clockwise. The rotation of the first adjusting shaft 94 causes the B-cam 94*b* of the first adjusting shaft 94 to slidably contacts with and presses the B-protrusion 68*b* of the first movable member 60, thus allowing the first movable member 60 to rotate counterclockwise in FIG. 16(*a*). Meanwhile, as shown in FIG. 16(*b*), the rotation of the second adjusting shaft 95 causes the B-cam 95*b* of the second adjusting shaft 95 to slidably contacts with and presses the B-protrusion 77*b* of the second movable member 61, thus allowing the second movable plate 61 to rotate counterclockwise in FIG. 16(*b*) and clockwise in FIG. 16(*a*).

In this manner, the first movable member 60 and the second movable member 61 can rotate in an opposite direction to each other, thereby enlarging or reducing the spacing between the first vertical protruded piece 72 of the first movable member 60 and the second vertical protruded piece 81 of the second movable member 61, i.e., the width of the tablet guiding path 8b.

Next, action of the rotor 8 in the tablet cassette 2 configured as described above will be described below.

As mentioned previously, the space between the cassette body 5 and the rotor 8 shown in FIG. 5 has the tablet pocket 8a extending circumferentially toward the upper part of the side face of the rotor 8, and a plurality of the tablet guiding paths 8b extending downwardly from the upper part of the side face of the rotor 8.

Referring to FIG. 5, tablets T received in the cassette body 5 enter the tablet pocket 8a with stirred by rotation of the rotor 8 and then enter the tablet guiding path 8b from the tablet pocket 8a; and when tablet guiding path 8b comes near the tablet discharging orifice 9, the partition member 20 fixed to the cassette body 5 enters between a tablet T at the lowest position and a tablet T at the upper position in the tablet guiding path 8b. The tablet T positioned upper than the partition member 20 is prevented from dropping down by the partition member 20. The tablet T at the lowest position lower than the partition member 20 lies on the tablet support stand 55, but because of the tablet support stand 55 being sloping, falls down on the tablet support stand 55 toward to the tablet discharging orifice 9, and then is discharged from the tablet discharging orifice 9. The tablet T discharged from the tablet discharging orifice 7 passes through and is dispensed from the tablet discharging path 3c of the base 2. As such, in every rotation of the tablet guiding path 8b to the tablet discharging orifice 9, tablets T are discharged one-by-one. Adjustment of the rotation angle of the rotor 8 allows for dispensing tablets T of the number in accordance with a prescription.

For tablet guiding path 8b, the partition adjusting mechanism M1, the depth adjusting mechanism M2, the height adjusting mechanism M3, and the width adjusting mechanism M4 as described above can be used to adjust an entry position of the partition member 20 corresponding to the thickness of the tablet T, the depth D corresponding to the thickness of the tablet T, the height H corresponding to the height of the tablet, and the width W corresponding to the width of the tablet T. Thus, in accordance with the shape or size of the tablet T received in the cassette body 5, the tablet guiding path 8b can have an appropriate size. As for difference in tablets T, without exchanging the whole body of the tablet cassette 2 or the rotor 8, the same tablet cassette 2 or rotor 8 can be used to adjust the tablet guiding path 8b fitting to various types of tablets T, thereby achieving discharge. Such adjustment can be performed automatically with the tablet guiding path adjusting apparatus as described below.

<Tablet Guiding Path Adjusting Apparatus>

FIG. 17 depicts a tablet guiding path adjusting apparatus 100 for a tablet cassette according to the present invention. The tablet guiding path adjusting apparatus 100 engages with the engaging parts 33c, 52b, and 95d of the respective adjusting members 33, 52, and 64 of the adjusting mechanism M2, M3, and M4 which each adjust the depth, height, and width of a recess of the tablet guiding path 8b in the tablet cassette 2 described previously, and operates these adjusting mechanisms, thereby adjusting the dimension of the tablet guiding path 8b in accordance with the shape or size of the tablet T received within the cassette body 5; as well as engages the engaging gear 24b of the partition adjusting member 24 in the partition adjusting mechanism M1 adjusting an entry position of the partition member 20, and operates the partition adjusting mechanism M1, thereby adjusting an entry position of the partition member 20 in accordance with the shape or size of the tablet T received within the cassette body 5 and the depth of a recess of the tablet guiding path 8b.

The tablet guiding path adjusting apparatus 100 includes an apparatus body 101, a cassette inserting part 102, a rotor mounting part 103, an elevator table 104 shown in FIG. 18, and an elevator operating part 105.

The apparatus body 101 has a lower frame 106 shown in FIG. 18, a side frame 107 standing from both end of the lower frame 106, an upper frame 108 disposed at the upper end of the side frame 107, and a rear frame 109 disposed at the rear of the upper frame 108.

The cassette inserting part 102 has a cassette inserting base 110 disposed in the upper frame 108. The cassette inserting base 110 has an inserting guide 110a, which allows for inserting the tablet cassette 2 as similar to the base 3 of the tablet storing and removing apparatus 1, and a seizing part 110b. In the rear frame 109 in the rear of the cassette inserting base 110, a partition adjusting shaft 111 is disposed as shown in FIGS. 19 and 20. The partition adjusting shaft 111 has a drive gear 112 for engaging with the engaging gear 24b of the partition adjusting member 24 in the tablet cassette 2 when inserting the tablet cassette 2. The partition adjusting shaft 111 is driven by the partition adjusting motor 113. Moreover, on the sloping frame 114 in the front of the rear frame 109, a detection lever 116 of a partition zero-point detection sensor 115 is protruded, which directly contacts with the movable member 23 of the partition adjusting mechanism M1 in the tablet cassette 2. As shown in FIG. 20, the detection lever 116 takes an L-shape, is disposed rotatably about the support shaft 117, and has a detection part 116a detected by the partition zero-point detection sensor 115.

The rotor mounting part 103 has a sensor attaching stand 118 disposed on the lower frame 106 as shown in FIG. 18. On the top face of the sensor attaching stand 118, the rotor inserting protrusion part 119 is disposed. The rotor inserting protrusion part 119 has an engaging shaft 120 with a shape similar to the engaging shaft 13 of the rotor driving part 10 in the cassette body 5, so as to allow for inserting the tablet cassette 2. On the side faces of the sensor attaching stand 118, a depth zero-point detection sensor 121, a height zero-point detection sensor 122, and a width zero-point detection sensor 123 are disposed, respectively. Respective detection parts 121a, 122a, and 123a of the sensors 121, 122, and 123 shown in FIG. 21 are protruded upwardly from the rotor mounting part 103, so as to face against and contact directly with the protrusion 37b of the guiding part 37 of the rotor 8 to be mounted on the rotor mounting part 103, the lower face of the tablet support stand 55, and the first vertical protruded piece 72, respectively.

In the elevator table 104, as shown in FIG. 18, a slider 125 disposed in the vertical parts 124 on both ends engages with a guide rail 126 disposed on the side frame 107 of the apparatus body 101, thereby allowing itself to move up/down. In the front part of the elevator table 104, a depth adjusting shaft 127, a height adjusting shaft 128, and a width adjusting shaft 129a, which extend vertically, are disposed rotatably.

The depth adjusting shaft 127 consists, as shown in FIG. 22, of a major diameter part 130 in the upper side, a minor diameter part 131 in the lower side, and a step part 132 between the major diameter part 130 and the minor diameter part 131; and has a pulley 133 attached on the upper end of the major diameter part 130 and an engaging shaft 134 attached on the lower end of the minor diameter part 131. In the engaging shaft 134, an engaging part 134*a* engaging with the engaging part 33*c* of the depth adjusting member 33 is formed at the lower end; and a hole 134*b* being inserted with the lower end of the minor diameter part 131, a slit 134*c* being slidably inserted with a pin 135 disposed at the lower part of the depth adjusting shaft 127 are formed at the upper end. Between the step part 132 of the depth adjusting shaft 127 and the upper end of the engaging shaft 134, the spring 136 is inserted. The height adjusting shaft 128 and the width adjusting shaft 129 also has the same configuration as that of the depth adjusting shaft 127.

As shown in FIG. 23, in the rear part of the elevator table 104, a depth driving shaft 137, a height driving shaft 138, and a width driving shaft 139 is disposed. Each of the driving shafts 137, 138, and 139 has a pulley 140 disposed thereon, which is connected to a pulley 133 of the depth adjusting shaft 127, the height adjusting shaft 128, or the width adjusting shaft 129 via a belt 141. Each of the driving shafts 137, 138, and 139 is allowed to drive rotatably by a depth adjusting motor 142, a height adjusting motor 143, and a width adjusting motor 144.

Returning to FIG. 19, the elevator operating part 105 consists of a lever 145, a handle 146, and a position detection sensor 147.

The levers 145 are disposed as a pair outside the side frames 107 on both side; one ends are attached rotatably to a support shaft 148 disposed between the side frames 107, and the other ends are connected to each other by a connecting bar 149. In the lever 145, a long hole 151, which is inserted slidably with a roller 150 disposed at a vertical part 124 of the elevator table 104 shown in FIG. 18, is formed. Furthermore, in the right lever 145 as viewed from the front, an arc part 152 around the support shaft 148 is formed, and a plurality of notches 152*a* and 152*b* are formed on the edge of the arc part 152.

The handle 146 is slidably attached along the longitudinal direction of the right lever 145 as viewed from the front. Moreover, the handle 146 is biased toward the support shaft 148 of the levers 145 by a spring 153. At the tip of the handle 146, an engaging pawl 154 is formed. The engaging pawl 154, upon the handle 146 being pressed downwardly, engages with an engaging part 155*a* of a stopper member 155 attached to the side frame 107, and is retained at a predetermined lower position.

The position detection sensor 147 is attached to the side frame 107, and along with rotation of the lever 145, sensitizes the notches 152*a* and 152*b* of the arc part 152 in the lever 145 and detects the position of the lever 145.

FIG. 24 depicts a system configuration diagram of the tablet guiding path adjusting apparatus 100. The tablet guiding path adjusting apparatus 100 includes a controller apparatus 200, a display apparatus 201, and a tablet master 202. Detection signals of the respective zero-point detection sensors 121, 122, and 123 for depth, height, and width and the partition zero-point detection sensor 115 are input into the controller apparatus 200. Moreover, a detection signal of the lever position detection sensor 147 is input into the controller apparatus 200. Furthermore, each of start signals from a first start button 203 disposed in the cassette inserting part 102 and a second start button 204 disposed in the rotor mounting part 103 is input into the controller apparatus 200. A tablet master 202 represents the first tablet master storage part and the second tablet master storage part of the present invention; and stores a recognition ID for the type of a tablet, each dimension of the depth, height, and width of the tablet guiding path 8*b* suitable for the shape or size of the tablet and such shape or size of the tablet, or an entry position toward the tablet guiding path 8*b* of the partition member 20 suitable for the depth of the tablet guiding path 8*b*. Instead of a dimension for the tablet guiding path 8*b*, a numerical value related to the dimension, for example, a corrective coefficient for the standard dimension may be stored. Similarly, instead of an entry position toward the tablet guiding path 8*b* of the partition member 20, a numerical value relative to the entry position, for example, a corrective coefficient for the standard entry position may be stored. The controller apparatus 200 drives the drive motors 142, 143, and 144 for depth, height, and width, and the partition drive motor 113, on the basis of detection signals from the tablet master 202, each of the sensors 121, 122, 123, 115, and 147, and the buttons 203 and 204; and adjusts a dimension of the tablet guiding path 8*b* and an entry position of partition member 20 in accordance with the shape or size of a tablet T received within the cassette body 5.

An action of adjusting a dimension of the tablet guiding path 8*b* of the rotor 8 in the tablet cassette 2 and an entry position of the partition member 20 using the tablet guiding path adjusting apparatus 100 configured as mentioned above will now be described with reference to FIG. 25.

At first, a tablet cassette 2 for exchanging tablets T is removed from the tablet storing and removing apparatus 1. If a tablet T is left in the tablet cassette 2, it is removed beforehand. As shown in FIG. 26, it is recommended to cut out a label 157 for a box 156 of tablets T to be newly received, and then insert into a pocket 6*a* of the tablet cassette 2.

In Step 1, the tablet cassette 2 removed from the tablet storing and removing apparatus 1 is inserted into the cassette inserting part 102 of the tablet guiding path adjusting apparatus 100.

In Step 2, the tablet to be newly received into the tablet cassette 2 is selected from a tablet list displayed on the display apparatus 201, and an OK button on the display apparatus 201 is pressed. An undepicted bar code reader may be used to read the tablet from a bar code of the label 157 inserted into the pocket 6*a* of the tablet cassette 2.

Once the OK button on the display apparatus 201 is pressed, in Step 3, the partition adjusting motor 113 drives, the partition member 20 goes back, and the tip of the partition member 20 moves aside from at least the notch 72*a* of the first movable member 60 and the notch 81*a* of the second movable member 61 in the cassette body 5. This allows for removing the rotor 8 from the cassette body 5.

In Step 4, the rotor 8 is removed from the cassette body 5 of the tablet cassette 2, and the rotor cover 30 of the rotor 8 is removed to expose each engaging part of the depth adjusting member 33, the height adjusting member 52, and the width adjusting member 64.

In Step 5, the rotor 8 removed from the cassette body 5 is mounted on the rotor mounting part 103 of the tablet guiding path adjusting apparatus 100 as shown in FIG. 26.

In Step 6, the handle 146 of the tablet guiding path adjusting apparatus 100 is held to flip down the lever 145. This makes each of the engaging parts 134*a* of the depth adjusting shaft 127, the height adjusting shaft 128, and the width adjusting shaft 129 engage with each engaging part of the depth adjusting member 33, the height adjusting member 52, and the width adjusting member 64 in the rotor 8. Each of the engaging parts of the depth adjusting shaft 127, the height adjusting shaft 128, and the width adjusting shaft 129 is maintained in an engagement state with each of the engaging part of the depth adjusting member 33, the height adjusting member 52, and the width adjusting member 64 in the rotor 8, by biasing force from the spring 136. The lever 145 is retained in a pressing-down state, since biasing force of the spring 153 in the handle 146 makes the engaging pawl 154 seized at the engaging part 155*a* of the stopper member 155. Furthermore, as the pushing-down position of the lever 145 is detected by the lever position detection sensor 147, the controller apparatus 200 judges as completion of setup for tablet guiding path adjustment.

Upon pressing the first start button 203 in Step 7, then in Step 8, each of the adjusting motors 142, 143, and 144 for depth, height, and width drives, and adjusts the depth, height, or width of the tablet guiding path 8*b* of the rotor 8 to a master value stored in the tablet master storage part 202, depending on the selected tablet. Additionally, during this action for adjustment of the tablet guiding path, the inside of the cassette body 5 of the tablet cassette 2 inserted into the cassette inserting part 102 can be cleaned.

To give a concrete explanation for an adjusting action of the tablet guiding path, at first, each of the adjusting motors 142, 143, and 144 is operated in a single direction until each of the zero-point detection sensors 121, 122, and 123 detects a zero-point.

In other words, as shown in FIG. 27, with rotation of the depth adjusting shaft 127, the depth adjusting mechanism M2 is operated; the guiding part 37 of the rotor body 31 moves downward; the protrusion 37*b* at the lower end of the guiding part 35 presses the detection part 121*a* of the depth zero-point detection sensor 121, and thus the depth zero-point is detected.

Moreover, as shown in FIG. 28, with rotation of the height adjusting shaft 128, the height adjusting mechanism M3 is operated; the tablet support stand 55 moves downward; the lower face of the tablet support stand 55 presses the detection part 122*a* of the height zero-point detection sensor 122, and thus the height zero-point is detected.

Furthermore, as shown in FIG. 29, with rotation of the width adjusting shaft 129, the width adjusting mechanism M4 is operated; the first vertical protruded piece 72 of the first movable member 60 and the second vertical protruded piece 81 of the second movable member 61 move in directions apart from each other; the first vertical protruded piece 72 of the first movable member pushes down the detection part 123*a* of the width zero-point detection sensor 123, and thus the width zero-point is detected.

Next, each of the motors 142, 143, and 144 is operated in another direction until, depending on the selected tablet, depth, height, and width of the tablet guiding path 8*b* reach each of master values stored in the tablet master storage part 202.

In Step 9, the rotor cover 30 is attached to the rotor 8 having depth, height, width adjusted already, and put back in the tablet cassette 2 of the cassette inserting part 102.

In Step 10 the second start button 204 is pressed, and then in Step 11, the partition adjusting motor 113 is driven, and depending on the selected tablet, the position of the partition member 20 toward the tablet guiding path 8*b* of the rotor 8 is adjusted to the master value.

To give a concrete explanation, as shown in FIG. 30, with driving of the partition adjusting motor 113, the partition adjusting shaft 111 rotates; the partition adjusting mechanism M1 is operated; the movable member 23 moves backward; the movable member 23 presses the detection part detection lever 116 of the partition zero-point detection sensor 115, and thus the detection part 116*a* moves and leads the partition zero-point detection sensor 115 to detect the partition zero-point. Next, the partition motor 113 is operated in another direction until, depending on the selected tablet, the entry position of the partition member 20 toward the tablet guiding path 8*b* reaches each of master values.

In Step 12, the tablet cassette 2 is removed from the tablet guiding path adjusting apparatus 100, and then in Step 13, data of the tablet to be received in the tablet cassette 2 is rewritten for the controller apparatus 300 of the tablet storing and removing apparatus 1.

In Step 12, the tablet cassette 2 having the tablet guiding path adjusted already received a new tablet, and is inserted at a predetermined position of the tablet storing and removing apparatus 1.

FIG. 31 depicts a modification example of the sensor attaching stand 118 and the rotor mounting part 103 in the tablet guiding path adjusting apparatus 100.

In the sensor attaching stand 118, a coil spring 118*a* and a slide shaft 118*b* inside the coil spring 118*a* are disposed in the center. At the upper end of the slide shaft 118*b*, a magnet 118*c* is attached. Around the coil spring 118*a*, the depth zero-point detection sensor 121, the height zero-point detection sensor 122, and the width zero-point detection sensor 123 are disposed respectively. Additionally, at the three-equal parts around the coil spring 118*a*, opening parts 118*d* are formed at positions corresponding to three links 103*e* described later.

The rotor mounting part 103 is sustained onto the sensor attaching stand 118 via the coil spring 118*a*, and is rendered movable along the slide shaft 118*b* of the sensor attaching stand 118 in a vertical direction. The rotor mounting part 103 has the rotor inserting protrusion part 119 to be mated with the engaging concave part 41*a* of the rotor 8 shown in FIG. 10. In the rotor inserting protrusion part 119, engaging pieces 119S and 119L are formed, which engage with large and small engaging holes 41S and 41L (only 41L is shown in FIG. 10) formed in the engaging concave part 41*a* of the rotor 8 shown in FIG. 10. Thus, the rotor 8 can be attached at only a single position in a rotation direction. In the rotor 9, a mark indicating an attachment direction is preferably provided so as to ensure that the engaging holes 41S and 41L engage with the engaging pieces 119S and 119L.

In the rotor mounting part 103, opening holes 103*a*, 103*b*, and 103*c* are formed around the rotor inserting protrusion part 119, which provide views of the depth zero-point detection sensor 121, the height zero-point detection sensor 122, and the width zero-point detection sensor 123. Moreover, in the rotor mounting part 103, holes 103*d* are formed, from which rotor receiver parts 103*g* of the three links 103*e* described later protrude. On the back face of the rotor mounting part 103, the three links 103*e* are distributed. The links 103*e* is rotatably disposed with the support shaft 103*f*, and has a rotor receiver part 103*g* on one end and a cam part 103*h* on the other end.

In the link 103*e*, the rotor receiver part 103*g* regularly protrudes upwardly from the hole 103*d* of the rotor mounting part 103 by self-weight of the cam part 103*h*, and the end part of the cam part 103*h* contacts directly with the edge of the opening part 118*d* of the sensor attaching stand 118. In such situation, even if the rotor mounting part 103 receives external force other than that from the rotor 8, it will not move downward. Thus, detection parts 121*a*, 122*a*, and 123*a* of each of the sensors 121, 122, and 123 are not exposed from opening holes 103*a*, 103*b*, and 103, respectively, but can protect each of the sensors 121, 122, and 123.

When the rotor 8 is inserted into the rotor mounting part 103 and pushed downward, the lower face of the rotor 8 presses simultaneously the rotor receiver parts 103*g* of the three links 103e. This makes the link 103e rotate about the support shaft 103f, thereby allowing the end part of the cam part 103h to release from the edge of the hole 118d. As a result, the rotor mounting part 103 stands against biasing force of the coil spring 118a and moves downward. Then, the magnet 118c of the slide shaft 118b sticks to be fixed onto the magnetic plate 46 of the rotor 8.

The embodiment described above can be modified variously within the scope of the invention recited in the claims. For example, the embodiment described above allows all of the depth, height, and width of a recess of the tablet guiding path to be adjusted, but any one or two of depth, height, width of the recess may also be adjusted. Moreover, the adjusting shaft is allowed to be manually moved up/down by a lever, but it may be moved up/down automatically. Furthermore, without removing the rotor 8 from the tablet cassette 2, and with opening the lid 6 of the tablet cassette 2 and removing the rotor cover 30, the tablet cassette 2 may be placed in the tablet guiding path adjusting apparatus so as to allow to adjust at least any one of depth, height, and width of the tablet guiding path 8b of the rotor 8 within the tablet cassette 2, or an entry position of partition member 20.

DESCRIPTION OF SIGNS

2: tablet cassette
5: cassette body
9: tablet discharging orifice
8b: tablet guiding path
20: partition member
24: partition adjusting member
33: depth adjusting member
52: height adjusting member
64: width adjusting member
100: tablet guiding path adjusting apparatus
101: apparatus body
102: cassette inserting part
103: rotor mounting part
104: elevator table
105: elevator table
105: elevator operating part
111: partition adjusting shaft (partition adjusting member)
113: partition adjusting motor
115: partition zero-point detection sensor (second zero-point detection part)
121: depth zero-point detection sensor (first zero-point detection part)
122: height zero-point detection sensor (first zero-point detection part)
123: width zero-point detection sensor (first zero-point detection part)
127: depth adjusting shaft (guiding path adjusting member)
128: height adjusting shaft (guiding path adjusting member)
129: width adjusting shaft (guiding path adjusting member)
137: depth driving shaft (guiding path driving part)
138: height driving shaft (guiding path driving part)
139: width driving shaft (guiding path driving part)
142: depth adjusting motor (guiding path driving part)
143: height adjusting motor (guiding path driving part)
144: width adjusting motor (guiding path driving part)
145: lever
200: controller apparatus
201: display apparatus
202: tablet master (first, second tablet master storage part)
203: first start button
204: second start button
M1: partition adjusting mechanism
M2: depth adjusting mechanism (tablet guiding path adjusting mechanism)
M3: height adjusting mechanism (tablet guiding path adjusting mechanism)
M4: width adjusting mechanism (tablet guiding path adjusting mechanism)

The invention claimed is:

1. A tablet guiding path adjusting apparatus for a tablet cassette, the tablet cassette comprising:
a rotor rotatably equipped within a cassette body and having a tablet guiding path for receiving at least one of tablets received within the cassette body and guiding to a discharging orifice of the cassette body,
a partition member, provided on an upper side of the discharging orifice, being located between a tablet at a lowest part and a tablet at an upper side thereof, the tablet at the lowest part being present on the tablet guiding path, and
a tablet guiding path adjusting mechanism configured to adjust at least either dimension of a depth and width of the tablet guiding path, wherein the depth of the tablet guiding path is defined by a dimension between a bottom face of a recess of the tablet guiding path and an inner face of the cassette body, and the width of the tablet guiding path is defined by a dimension between two side walls of the tablet guiding path,
the tablet guiding path adjusting apparatus for adjusting the tablet guiding path adjusting mechanism in the tablet cassette comprising:
a guiding path adjusting member for engaging with an engaging part of the tablet guiding path adjusting mechanism,
a guiding path driving part for driving the guiding path adjusting member, and
a first zero-point detection part for detecting a zero-point of the tablet guiding path adjusting mechanism;
wherein the tablet guiding path adjusting apparatus drives the guiding path adjusting member by the guiding path driving part, and upon detecting the zero-point of the tablet guiding path adjusting mechanism by the first zero-point detection part, operates the tablet guiding path adjusting apparatus for a preset amount in accordance with a shape or size of tablets received within the cassette body.

2. The tablet guiding path adjusting apparatus of claim 1, wherein the tablet guiding path adjusting mechanism is further configured to adjust a dimension of height of the tablet guiding path,
wherein the height of the tablet guiding path is defined by a dimension between a tablet support stand located at a bottom end of the tablet guiding path and the partition member.

3. The tablet guiding path adjusting apparatus for a tablet cassette according to claim 1, wherein the tablet guiding path adjusting apparatus has a first tablet master storage part for storing a dimension of the tablet guiding path suitable for the shape or size of tablets or a numerical value related to the dimension, and adjusts a dimension of the tablet guiding path to the dimension stored in the first tablet master storage part or the numerical value related to the dimension in accordance with the shape or size of the tablets received within the cassette body.

4. The tablet guiding path adjusting apparatus for a tablet cassette according to claim 1, wherein the cassette body has:
 a partition adjusting mechanism for adjusting an entry position of the partition member, wherein the tablet guiding path adjusting apparatus engages with an engaging part of the partition adjusting mechanism to operate the partition adjusting mechanism, and adjusts an entry position of the partition member in accordance with the shape or size of tablets received within the cassette body, or the depth of the tablet guiding path.

5. The tablet guiding path adjusting apparatus for a tablet cassette according to claim 4, comprising:
 a partition adjusting member for engaging with the engaging part of the partition adjusting mechanism,
 a partition driving part for driving the partition adjusting member, and
 a second zero-point detection part for detecting the zero-point of the partition adjusting mechanism,
 wherein the tablet guiding path adjusting apparatus drives the partition adjusting member by the partition driving part, and upon detecting the zero-point of the partition adjusting mechanism by the second zero-point detection part, arranges the partition member at a preset entry position in accordance with the shape or size of tablets received within the cassette body, or the depth of the tablet guiding path.

6. A tablet guiding path adjusting apparatus for a tablet cassette according to claim 4, wherein the tablet guiding path adjusting apparatus has a second tablet master storage part for storing an entry position of the partition member to the tablet guiding path suitable for the shape or size of tablets or the depth of the tablet guiding path, or a numerical value related to the entry position, and adjusts an entry position of the partition member to the entry position stored in the second tablet master storage part or the numerical value related to the entry position in accordance with the shape or size of the tablets received within the cassette body or the depth of the tablet guiding path.

7. The tablet guiding path adjusting apparatus for a tablet cassette according to claim 4, comprising:
 a cassette inserting part for inserting the cassette body, and
 a rotor mounting part for mounting the rotor removed from the cassette body inserted the cassette inserting part.

8. The tablet guiding path adjusting apparatus for a tablet cassette according to claim 7, wherein after the cassette body is inserted to the cassette inserting part, a partition adjusting member engages with the engaging part, allows a partition driving part to drive the partition adjusting member, and makes the partition member evacuate from the tablet guiding path.

9. The tablet guiding path adjusting apparatus for a tablet cassette according to claim 1, comprising:
 a cassette inserting part for inserting the cassette body, and
 a rotor mounting part for mounting the rotor removed from the cassette body inserted the cassette inserting part.

10. The tablet guiding path adjusting apparatus for a tablet cassette according to claim 9, comprising a lever for making the guiding path adjusting member descend until the guiding path adjusting member engages with the engaging part of the rotor mounted at the rotor mounting part.

* * * * *

UNITED STATES PATENT AND TRADEMARK OFFICE
CERTIFICATE OF CORRECTION

PATENT NO. : 11,197,804 B2
APPLICATION NO. : 16/639513
DATED : December 14, 2021
INVENTOR(S) : Koike et al.

It is certified that error appears in the above-identified patent and that said Letters Patent is hereby corrected as shown below:

In the Claims

Column 22, Line 47, after the word "adjusting" please amend "apparatus" to --mechanism--.

Signed and Sealed this
Fourteenth Day of June, 2022

Katherine Kelly Vidal
*Director of the United States Patent and Trademark Office*